(12) United States Patent
Kitamura et al.

(10) Patent No.: US 7,776,284 B2
(45) Date of Patent: Aug. 17, 2010

(54) APPARATUS OF CATALYST-CIRCULATION TYPE FOR DECOMPOSING WASTE PLASTICS AND ORGANICS, AND SYSTEM THEREOF

(75) Inventors: Tatsuo Kitamura, Kusatsu (JP); Yoshihide Kitamura, Kusatsu (JP); Itsushi Kashimoto, Kusatsu (JP)

(73) Assignee: Kusatsu Electric Co., Ltd., Shiga (JP)

( * ) Notice: Subject to any disclaimer, the term of this patent is extended or adjusted under 35 U.S.C. 154(b) by 673 days.

(21) Appl. No.: 11/689,211

(22) Filed: Mar. 21, 2007

(65) Prior Publication Data

US 2007/0249887 A1 Oct. 25, 2007

(30) Foreign Application Priority Data

Apr. 19, 2006 (JP) ............................ 2006-115920
Apr. 19, 2006 (JP) ............................ 2006-115925
Jan. 26, 2007 (JP) ............................ 2007-016087

(51) Int. Cl.
*B01J 8/04* (2006.01)
(52) U.S. Cl. ..................... 422/190; 422/213; 422/223; 422/224; 48/127.7
(58) Field of Classification Search ................. 588/19, 588/300, 301, 318, 321; 585/241, 648; 202/42; 422/190, 213, 223, 224; 48/127.7
See application file for complete search history.

(56) References Cited

U.S. PATENT DOCUMENTS

| 4,584,421 | A | * | 4/1986 | Saito et al. ................. 585/241 |
| 5,387,734 | A | * | 2/1995 | Hagenmaier et al. ........ 588/316 |
| 5,608,136 | A | * | 3/1997 | Maezawa et al. ............ 588/316 |
| 6,270,630 | B1 | * | 8/2001 | Xing ............................ 202/84 |
| 6,888,041 | B1 | | 5/2005 | Nakamura |
| 7,034,198 | B2 | * | 4/2006 | Osada et al. ................. 588/19 |
| 2008/0099323 | A1 | | 5/2008 | Kitamura et al. |

FOREIGN PATENT DOCUMENTS

| EP | 1 403 357 | 3/2004 |
| JP | 57-178719 | 11/1982 |
| JP | 10-95984 | 4/1998 |
| JP | 2002-363337 | 12/2002 |
| JP | 2003-528937 | 9/2003 |
| JP | 2003-334529 | 11/2003 |
| JP | 2004 182837 | 7/2004 |
| JP | 2005-139440 | 6/2005 |
| JP | 2005-200538 | 7/2005 |
| JP | 2005 307007 | 11/2005 |
| JP | 2007-8092 | 1/2007 |
| WO | WO 98/54098 | 12/1998 |

(Continued)

OTHER PUBLICATIONS

European Search Report for corresponding European Patent Application No. 07 00 5947 dated Jul. 31, 2007 (4 pages).

(Continued)

*Primary Examiner*—N. Bhat
(74) *Attorney, Agent, or Firm*—Kilyk & Bowersox, P.L.L.C.

(57) ABSTRACT

To provide a decomposition apparatus and a decomposition system which can prolong the catalyst life and which can efficiently decompose a large amount of waste plastics and organics.

16 Claims, 15 Drawing Sheets

FOREIGN PATENT DOCUMENTS

WO            WO 01/05908          1/2001

OTHER PUBLICATIONS

International Search Report for corresponding International Patent Application No. PCT/JP2007/056505 dated Jul. 10, 2007 (4 pages).

International Preliminary Report on Patentability for corresponding International Patent Application No. PCT/JP2007/056505 dated Nov. 17, 2008 (8 pages).

* cited by examiner

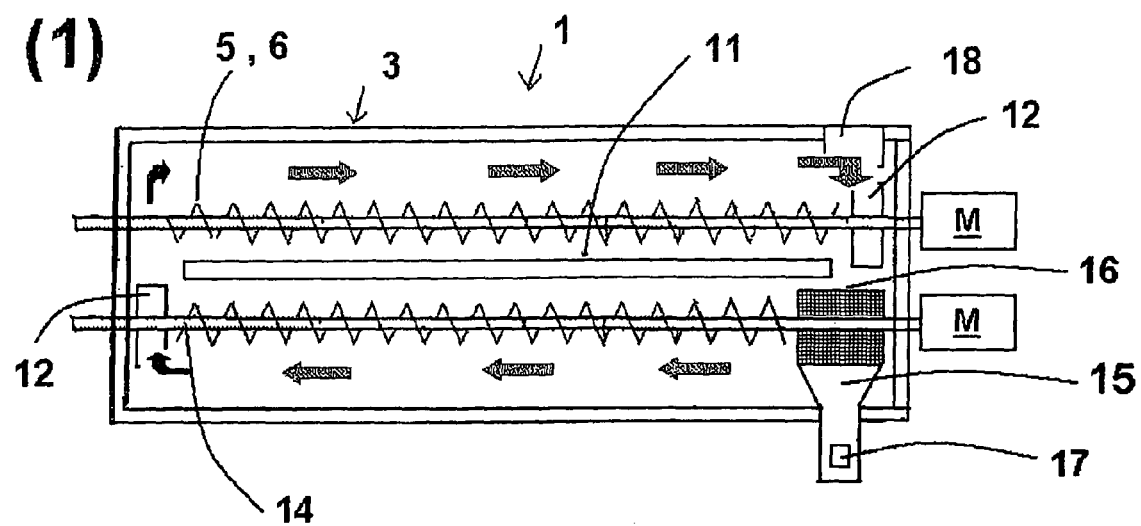
FIG. 2 (1)

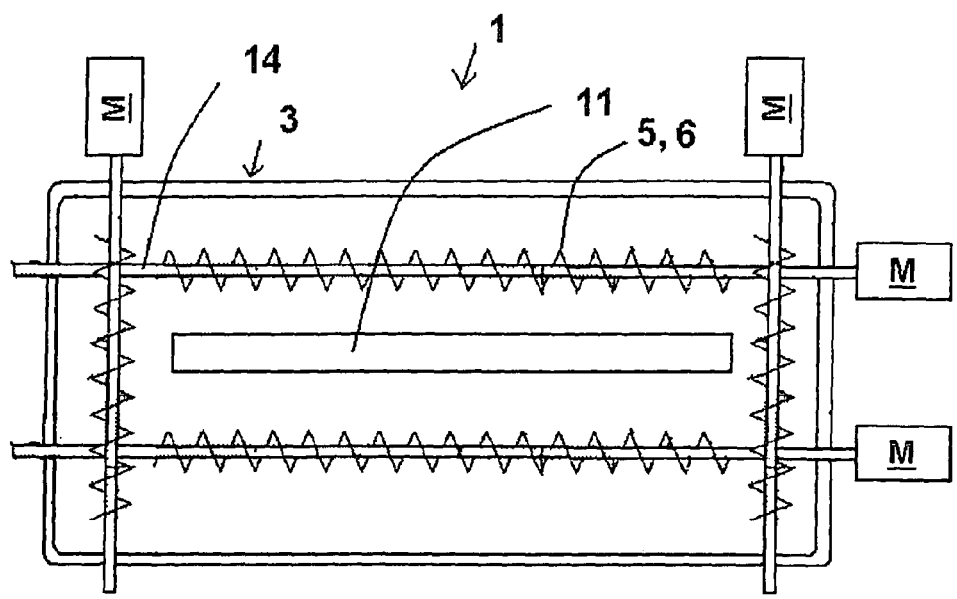
FIG. 2 (2)

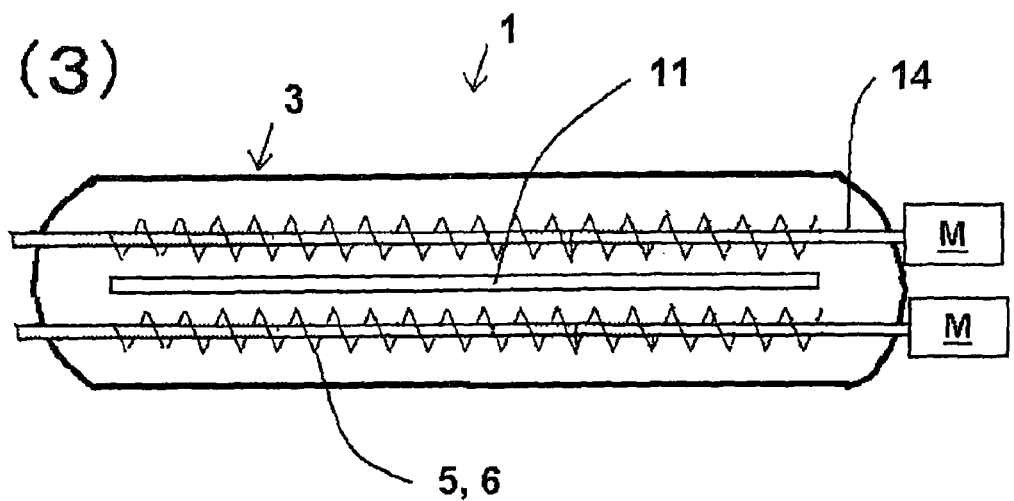
FIG. 2 (3)

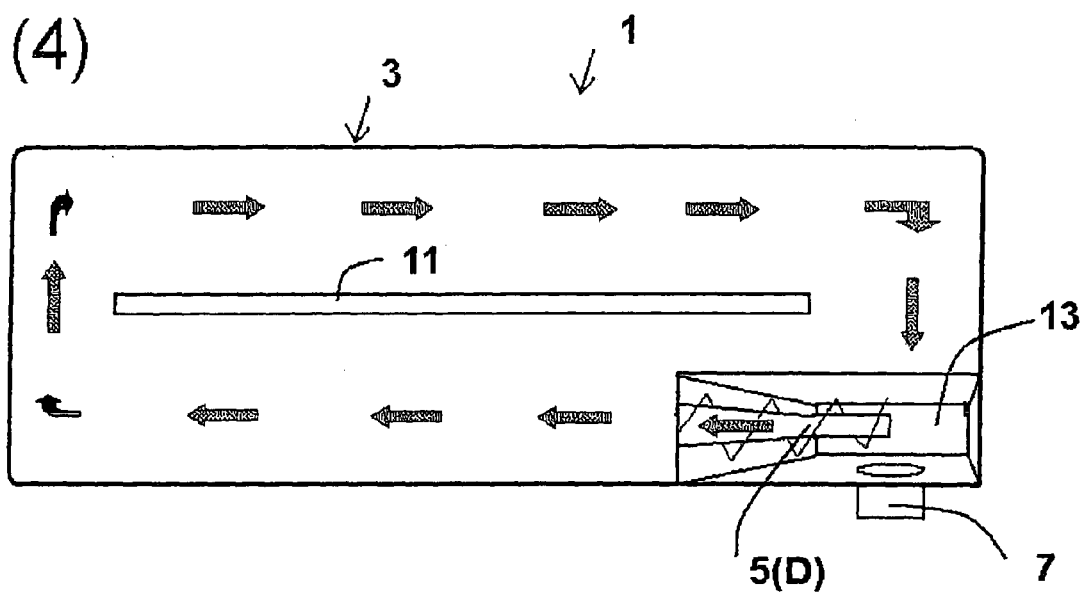
FIG. 2 (4)

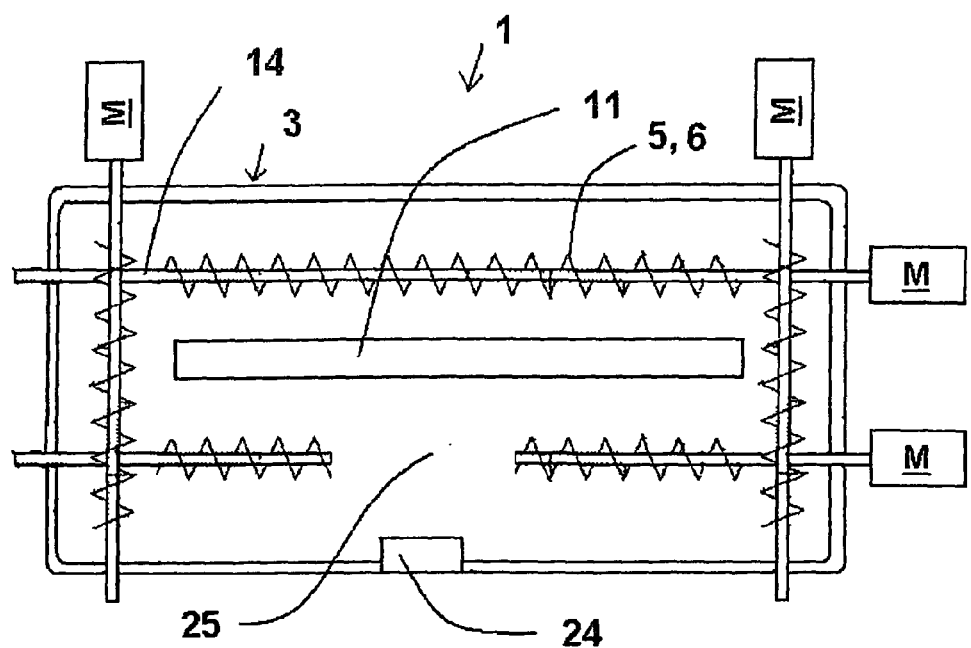
FIG. 2 (5)

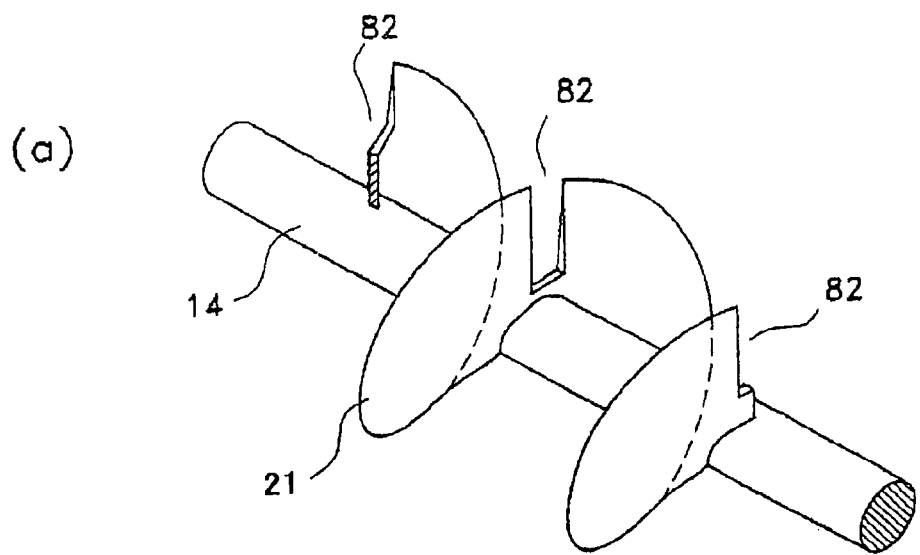
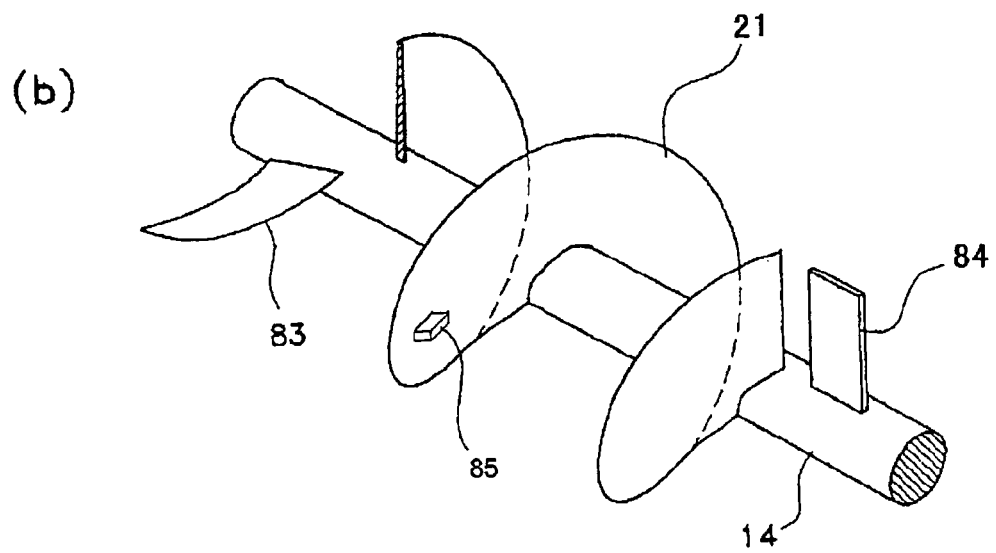
FIG. 7

"PRIOR ART"

APPARATUS OF CATALYST-CIRCULATION TYPE FOR DECOMPOSING WASTE PLASTICS AND ORGANICS, AND SYSTEM THEREOF

BACKGROUND OF THE INVENTION

1. Field of the Invention

The present invention relates to an apparatus of catalyst-circulation type for decomposing waste plastics and organics, and to a system thereof at high efficiency. The decomposition apparatus further includes a means for separating and recovering metals and inorganics which are mixed in the waste plastics or which are vapor-deposited or adhered to at least a portion of the waste plastics.

This application claims the priority of Japanese Patent Application No. 2006-115920, No. 2006-115925 and No. 2007-016087.

2. Related Background of the Invention

Organics such as plastics are difficult for treating on discarding them. Incineration treatment of them raises a danger of generating toxic substances such as dioxins.

Plastics pieces often contain metals such as aluminum and copper, and inorganics, and have metals vapor-deposited or adhered to the surface of plastics, depending on the uses of the plastics. If those plastics pieces are incinerated, toxic gases may be generated or the incineration furnace may be damaged.

Accordingly, organics such as plastics pieces are treated by landfilling in some cases. As plastics, however, they are not decomposed in the ground. In addition, the availability of landfill sites has become difficult. Although there are biodegradable plastics, they have drawbacks of taking a long period of time until they are decomposed and of need of a very large area for biodegradation. Furthermore, reusable metals, rare metals, and inorganics mixed in the waste plastics and organics cannot be separated therefrom, and they are simply landfilled or incinerated together with the waste plastics and organics.

There exists a conventional process for decomposing organics utilizing a catalyst, as illustrated in FIG. 11. According to the existing process, organics such as plastics are crushed into granules in a crusher 101, and then the crushed organics are charged into a reactor 102 in drum shape, the reactor 102 containing catalyst granules in advance. After that, agitation blades 103 are rotated in the reactor 102 to agitate the catalyst with the organics, while supplying hot air into the reactor 102 using an air-supply blower 104. The work of the catalyst enhances the decomposition of the organics, thus the organics are gasified.

Although the catalyst is left behind in the reactor 102, the gasified organics pass through a separator 106 consisting mainly of cyclone dust collector, and only water vapor and carbon dioxide are emitted to atmosphere as the exhaust gas. By above gasification of the organics charged into the reactor 102, new organics at an amount corresponding to the amount of gasified organics can be charged to the reactor 102, thereby allowing the above process to continuously operate without interruption.

Above existing decomposition apparatus, however, cannot conduct efficient treatment for decomposing waste plastics, and requires large treatment cost and large apparatus.

Furthermore, the treatment of waste containing polyvinylchloride is known to generate hydrogen chloride gas and nitrogen compounds. In addition, the treatment of Teflon® is known to generate toxic hydrogen fluoride gas. The treatment of those kinds of gases becomes a problem.

Regarding the prevention of secondary infection caused by infectious medical waste discharged from hospitals, dialysis facilities, and the like, a guideline specifying the treatment method of that kind of waste was issued from the Ministry of Health and Welfare on Nov. 17, 1999, and was enforced on Apr. 1, 2000. The guideline orders the hospitals, dialysis facilities, and the like to conduct in-house sterilization of the medical waste, in principle.

In this regard, there is wanted the development of a decomposition method for waste plastics, in particular the infectious medical waste containing polyvinylchloride, applicable in hospitals or clinics safely without using large scale apparatus.

Other than above-described method, the technologies relating to the decomposition of plastics and the like are disclosed in the following Patent Documents 1 to 5.

[Patent Document 1] Japanese Patent Application Laid-Open No. 2002-363337

[Patent Document 2] Japanese Patent Application Laid-Open No. 2004-182837

[Patent Document 3] Japanese Patent Application Laid-Open No. 2005-066433

[Patent Document 4] Japanese Patent Application Laid-Open No. 2005-205312

[Patent Document 5] Japanese Patent Application Laid-Open No. 2005-307007

SUMMARY OF THE INVENTION

Disclosure of the Invention

Problems to be Solved by the Invention

Large portion of industrial waste including medical waste is occupied by plastics, organics, and the like. The waste also contains aluminum thin films vapor-deposited on inner face of packages, and syringe needles. Those metals remain in the reactor even after the entire organics are gasified. If the metals are aluminum and the like, continuous operation of decomposition while aluminum and the like remaining in the reactor induces vigorous oxidation of aluminum and the like, which results in difficulty in recycling the aluminum and the like.

If the above operation is stopped to successively take out the metals from the reactor, the mass or volume of organics being able to be decomposed within a specified period of time, (hereinafter referred to as the "throughput"), becomes small. If the metals are to be separated outside the reactor, the catalyst temperature at the activation temperature becomes low at every catalyst-takeout cycle, which needs reheating, thereby wasting the thermal energy.

In a conventional decomposition apparatus, the catalyst which is powdered and emitted is discarded without recycling to the reactor. The reason is that, if the catalyst is in an approximate size range from 1 to 3 mm, flow of catalyst occurs in entire zone in the reactor accompanied with the rotation of the agitation blades, and that the powdered catalyst, however, is difficult to flow, and is difficult to mix with the waste plastics and organics. The problem hinders the scale up of reactor because the phenomenon becomes significant with the increase in the amount of catalyst accumulated in the reactor, and further hinders the increase in the throughput.

To recover metals from waste plastics and organics containing the metals including aluminum and copper, such as silver foil composite, without oxidizing them, carbonization treatment or the like is applied. Use of a vacuum melting furnace, however, increases the cost for metal recovery. The melting treatment to the plastics pieces oxidizes the metals, which fails to recover high purity metals.

Furthermore, there is a problem to hinder the practical application of decomposition apparatus. The problem is the treatment of: HCl generated during decomposition of chlorine-based plastics such as polyvinylchloride; sulfur compounds and nitrogen compounds generated during decomposition of biological waste and varieties of medical waste plastics; hydrogen fluoride generated during decomposition of fluorine compounds such as Teflon®; and other substances.

The present invention has been derived to solve the above problems, and an object of the present invention is to provide an apparatus and a system for decomposing a large amount of waste plastics and organics efficiently while elongating the catalyst life.

Another object of the present invention is to provide a decomposition apparatus and a decomposition system for separating and recovering metals and/or inorganics in a process of circulating and/or agitating catalyst.

A further object of the present invention is to provide a decomposition apparatus and a decomposition system for removing: HCl generated during decomposition of chlorine-based plastics such as polyvinylchloride; sulfur compounds and nitrogen compounds generated during decomposition of biological waste and varieties of medical waste plastics; hydrogen fluoride generated during decomposition of fluorine compounds such as Teflon®; and other substances.

Means for Solving the Problems

To solve the above problems, the inventors of the present invention conducted detail studies, and established following-described decomposition apparatus and decomposition system, thus perfected the present invention.

The present invention provides:

1. An apparatus of catalyst-circulation type for decomposing waste plastics and organics, comprising (1) a means for treating waste plastics and organics, and (2) a means for treating oxidation catalyst.
2. The apparatus for decomposing waste plastics and organics according to preceding clause 1, wherein the means for treating waste plastics and organics includes: a reactor which circulates a catalyst in the reactor; and a means for circulating and/or agitating waste plastics and/or organics, charged from a charge opening of the reactor, together with the catalyst, (a circulation and/or agitation means), the waste plastics and/or organics being gasified in the step of circulating the waste plastics and/or organics together with the catalyst in the reactor.
3. The apparatus for decomposing waste plastics and organics according to preceding clause 2, wherein the circulation and/or agitation means is one or more screw feeders which have spiral blades mounted to the respective rotary shafts rotated by the respective drive sources, the rotary shafts being inserted into the reactor.
4. The apparatus for decomposing waste plastics and organics according to preceding clause 3, wherein the two screw feeders are located in substantially horizontal position in the reactor, and the rotation of the two screw feeders circulates the waste plastics and/or organics together with the catalyst in the reactor substantially in horizontal direction.
5. The apparatus for decomposing waste plastics and organics according to preceding clause 2, wherein the means for treating waste plastics and organics includes: a reactor which circulates a catalyst from upstream end to downstream end in the reactor; a circulation means which circulates waste plastics and/or organics charged from a charge opening of the reactor together with the catalyst from the upstream end to the downstream end; an agitation means which agitates the catalyst and the waste plastics and/or organics in the reactor; and a returning passage which guides the catalyst from the downstream end to the upstream end in the reactor, the waste plastics and/or organics being gasified in the step of circulating the waste plastics and/or organics together with the catalyst from the upstream end to the downstream end in the reactor.
6. The apparatus for decomposing waste plastics and organics according to preceding clause 5, wherein the reactor is divided into a first stage tank having the upstream end, and a second stage tank having the downstream end and being located at higher position than the position of first stage tank, thereby the catalyst being guided from the downstream end in the second stage tank into the returning passage to flow down to the upstream end in the first stage tank.
7. The apparatus for decomposing waste plastics and organics according to preceding clause 5, wherein the upstream end and the downstream end in the reactor are located substantially in horizontal position, thereby the catalyst after sliding down from the downstream end by the self weight being guided into the returning passage, and then flowing up to the upstream end.
8. The apparatus for decomposing waste plastics and organics according to any one of preceding clauses 5 to 7, wherein the circulation means is a screw feeder which has a spiral blade mounted to a rotary shaft rotated by a drive source, the rotary shaft being inserted into the reactor.
9. The apparatus for decomposing waste plastics and organics according to preceding clause 8, wherein the spiral blade has an auxiliary blade.
10. The apparatus for decomposing waste plastics and organics according to preceding clause 2, wherein the means for treating waste plastics and organics includes: a reactor which circulates a catalyst from upstream end to downstream end in the reactor; a cage which can position the waste plastics and/or organics in the reactor; and a returning passage which guides the catalyst from the downstream end to the upstream end in the reactor, the waste plastics and/or organics in the cage being contacting with the catalyst and further being gasified in the step of dropping (circulating) the catalyst from the upstream end to the downstream end in the reactor.
11. The apparatus for decomposing waste plastics and organics according to any one of preceding clauses 2 to 10, wherein the reactor can supply a carrier gas from a plurality of holes opened on the bottom of the reactor directly into the catalyst in a uniformly distributed manner.
12. The apparatus for decomposing waste plastics and organics according to any one of preceding clauses 2 to 11, wherein the step of circulation in the reactor has a means for separating and recovering metals and/or inorganics.
13. The apparatus for decomposing waste plastics and organics according to preceding clause 12, wherein the means for separating and recovering metals and/or inorganics is a means for separating the catalyst from a mixture of the waste plastics and/or organics and the catalyst in the step of circulation in the reactor.
14. The apparatus for decomposing waste plastics and organics according to preceding clause 13, wherein the means for separating the catalyst from a mixture of the waste plastics and/or organics and the catalyst is a means for separating the metals and/or inorganics from the catalyst based on the size difference therebetween.
15. The apparatus for decomposing waste plastics and organics according to preceding clause 14, wherein the means for separating the metals and/or inorganics from the catalyst based on the size difference therebetween installs a sieve which allows the catalyst to pass therethrough in the step of circulation in the reactor.

16. The apparatus for decomposing waste plastics and organics according to any one of preceding clauses 1 to 15, further has one or more of the following means:
(1) alumina catalyst treatment means
(2) crushing means
(3) carrier gas supply means
(4) cyclone dust collection means
(5) dust collection means with bag filter
(6) heat exchange means
(7) preheater means
(8) exhaust blower means
(9) cooling means
(10) heat recovery means
(11) HCl continuous measurement means
(12) CO continuous measurement means
(13) alarm means
(14) lime neutralization treatment means.

17. A decomposition system for waste plastics and organics using a decomposition apparatus according to any one of preceding clauses 1 to 16, thereby decomposing the waste plastics and organics while controlling the heating temperature of the catalyst, composed of titanium oxide granules in which the active ingredient is titanium oxide, within the range of 420° C. to 560° C.

18. The decomposition system according to preceding clause 17, wherein the titanium oxide granules in which the active ingredient is titanium oxide have characteristics of:
(1) the specific surface area from 35 to 50 $m^2/g$; and
(2) the granule size of 3.5 mesh (5.60 mm) or smaller.

19. The decomposition system according to preceding clause 18, wherein the titanium oxide granules are a mixture of titanium oxide as the activate ingredient and any one of below (1) and (2):
(1) aluminum oxide, and
(2) silicon oxide.

Effect of the Invention

According to the decomposition apparatus and the decomposition system of the present invention, the supply of hot air heated by the heating means into the reactor in which the catalyst is circulating can heat the catalyst to the activation temperature. Once the catalyst is heated, the decomposition heat of waste plastics and organics can be utilized to maintain the optimum activation temperature of the catalyst in the reactor, and can suppress the energy supply from outside, thereby allowing effective use of thermal energy.

When the waste plastics and organics are charged from the charge opening of the reactor, the waste plastics and organics are circulated in the reactor together with the catalyst by a circulation means. In this step, since the waste plastics and organics are agitated by an agitation means together with the catalyst, the contact between the catalyst and the waste plastics and organics is repeated, thus keeping the density of catalyst and waste plastics and organics constant, thereby enhancing the efficient decomposition based on the catalyst action. As a result, the waste plastics and organics charged from the charge opening of the reactor are gasified until they make about a round (one circulation) in the reactor.

Alternatively, a cage containing the waste plastics and organics is placed in the reactor. During the step of falling the catalyst down from the upstream end to the downstream end in the reactor, (the step of circulation), the waste plastics and/or organics are brought into contact with the catalyst, and are gasified. In this case, above-described agitation means for the waste plastics and organics with the catalyst is not required.

The catalyst keeps circulating in the reactor. According to an embodiment of Example 1 described below, the catalyst circulates horizontally in the reactor. According to another embodiment of Examples 2, 3, and 4, the catalyst once travels from the upstream end to the downstream end in the reactor, which is then guided by the returning passage to return to the upstream end in the reactor, thus circulating in the reactor. Consequently, the catalyst keeps circulating in the reactor. When additional waste plastics and organics are charged into the rector, they are efficiently gasified by the action of catalyst circulating in the reactor.

According to the embodiment of Examples 1 to 3, the organics which occupy the large portion of waste plastics and organics are gasified during the step of circulating the waste plastics and organics together with the catalyst in the reactor by the circulation means. The metals and inorganics mixed in the waste plastics and organics are, however, left in the catalyst. Since these metals and inorganics are separated and recovered by the means for separating and recovering metals and/or inorganics in the step of circulating the waste plastics and organics together with the catalyst, these metals and inorganics can be taken out from the catalyst.

The decomposition apparatus and the separation system therefore suppress the oxidation of metals and inorganics without leaving large amounts of metals and inorganics in the reactor, and achieve the recycle of metals and inorganics. Furthermore, since there is no need to stop operation of the circulation means and the agitation means during the separation and recovery of metals by the means for separating and recovering the metals and/or inorganics, the throughput of the waste plastics and organics can maintain a high level. In addition, on classifying the metals and inorganics by the separation and recovery means, there is no need to open the reactor, or there is no need of taking out the catalyst from the decomposition apparatus to separate the metals and inorganics. Therefore, the thermal efficiency of the decomposition apparatus and the decomposition system can maintain a high level.

According to the decomposition apparatus and the decomposition system of the present invention, they comprise a means for treating oxidation catalyst, and preferably further comprise a lime neutralization means. Consequently, they can conduct high efficiency treatment of waste plastics, organics, in particular industrial waste such as medical waste composed of varieties of plastics, biological substances such as blood, and plastics with adhered biological substances. Furthermore, they can easily conduct the treatment of plastics which generate HCl, hydrogen fluoride, sulfur compounds, nitrogen compounds, and the like during decomposition step, of organics, of biological substances such as blood, and of fluorine compounds generating hydrogen fluoride.

DESCRIPTION OF THE PREFERRED EMBODIMENTS

Best Mode for Carrying Out the Invention

A decomposition apparatus and a decomposition system according to the present invention will be described below referring to the drawings. In the following description, known technologies including drive source, air-supply blower, and screw feeder may not be described or given in the drawing. The shape of the decomposition apparatus, the arrangement of individual elements, and the scale of them are given preferentially for the convenience of illustration, and they are not the practical ones.

As shown in FIGS. 1 and 2, the means for treating waste plastics and organics 1, (Example 1), of the present invention has at least a reactor 3 in which a catalyst 2 is circulating, a circulation means 5 which circulates waste plastics and organics 4 charged into the reactor 3 together with the catalyst 2, an agitation means 6 which agitates the catalyst 2 and the waste plastics and organics 4, and a charge opening 7. The means for treating waste plastics and organics 1 further preferably has an air-supply blower 19 as a carrier gas (air) supply means, a heating means 9 which supplies heat necessary for the decomposition reaction, an air-blowing chamber 10, a partition wall 11 which allows smooth circulation of catalyst, a paddle 12 which changes the flow of catalyst, and an vent opening 39. Furthermore, the means for treating waste plastics and organics 1 has a discharge opening 18 for metals and inorganics, the opening 18 being a means for directly recovering large lumps of metals and inorganics from the reactor.

As shown in FIG. 2(1), the circulation means 5 is a twin screw feeder, which has each rotary shaft rotated by a drive source, equipped with a spiral blade. Each rotary shaft is inserted into the reactor. The twin screw feeder is preferably located in substantially horizontal position in the reactor. The arrow in FIG. 2(1) directs the clockwise circulation direction of catalyst. Change of the rotational direction of the twin screw feeder changes the direction of catalyst circulation to counterclockwise. The rotary shaft 14 is rotated by a drive source M such as a motor.

Although in FIG. 2(1) two paddles 12 for changing the flow of the catalyst are located on a diagonal line of the reactor, the paddles may be changed to other means if only the means can change the flow of the catalyst.

As shown in FIG. 2(2), if four screw feeders are located in substantially horizontal position in the reactor, the catalyst circulation is established.

Furthermore, as shown in FIG. 2(3), if the reactor is in an elliptical shape, only two screw feeders can achieve the catalyst circulation.

In addition, as shown in FIG. 2(5), if three screw feeders are located in substantially horizontal position in the reactor, the catalyst circulation is established and solid waste plastics and organics, which is not crushed, can be decomposed around degradation site of waste plastics and organics in the reactor.

When the circulation means 5 adopts screw feeder, the spiral blade 21 (refer to FIG. 7) also agitates the catalyst 2 with the waste plastics and organics 4, adding to performing the circulation step, thus the circulation means 5 also functions as the agitation means 6. That is, the screw feeder provides both the circulation means 5 and the agitation means 6. In addition, the spiral blade 21 is preferably equipped with an auxiliary blade.

The above decomposition means can be provided with a means for separating and recovering metals and/or inorganics 15. As illustrated in FIG. 2(1), the separation and recovery means 15 may have a wire mesh 16 having an opening to allow the catalyst 2 of largest size to pass through fitting to any position in the circulation route in the reactor 3. Preferably, however, the wire mesh 16 is fitted in the vicinity of the end point in the circulation route. A pocket 17 for recovering the metals and inorganics caught by the wire mesh is attached to the wire mesh 16. By locating the wire mesh 16 at higher position than the position of the pocket 17, (by creating a slope from the wire mesh to the pocket), the metals and inorganics caught by the wire mesh slide down into the pocket 17 by their self weight. Alternatively, by vibrating the wire mesh using a motor or the like, the metals and inorganics caught by the wire mesh 16 can be recovered by dropping them into the pocket 17. The pocket 17 has a two-stage shutter to allow the metals and inorganics to be recovered at arbitrary time during the decomposition reaction. Nevertheless, when the metals and inorganics are accumulated to some volume, they may be recovered from the pocket 17.

According to the present invention, when the means for separating and recovering metals and/or inorganics 15 separates and recovers the metals and inorganics from the pocket 17, there is no need of stopping the circulation means 5 and/or the agitation means 6 so that the throughput of the waste plastics and organics can maintain a high level. In addition, when the separation and recovery means separates the metals and inorganics, there is no need of opening the reactor 3 so that the thermal efficiency of the decomposition apparatus and the decomposition system can maintain a high level. However, the separation and recovery of the metals and/or inorganics can naturally be done after opening the reactor 3.

Furthermore, when valuable metals are mixed in the waste plastics and organics 4, a discharge opening for metals and inorganic 18 is used as a method to efficiently recover the metals. For example, the waste plastics and organics 4 containing valuable metals are put in wire mesh (which allows the catalyst 2 to pass through and has shape of not to cause an abstraction of the catalyst-circulation (example, cube, polyhedron)), which wire mesh is then charged from the charge opening 7. The waste plastics and organics in the wire mesh are gasified in the course of circulating the shape wire mesh in the reactor. The metals which are not gasified are left behind in the wire mesh. The shape wire mesh is directly recovered from the discharge opening of metals and inorganics 18, thereby allowing the metals remained in the shape wire mesh to be efficiently recovered.

Different from above case, when the size of the recovering metal is smaller than that of the catalyst 2, the means for separating and recovering metals and/or inorganics 15 is preferably a wire mesh located at: lowermost position in a concave portion 13 in FIG. 2(4) for Example 1; and lowermost position in a returning passage 20 for Examples 2 and 3. If the metal-collecting vessel is placed below the wire mesh, the metals separated from the waste plastics and organics 4 can automatically be collected.

With the above structure, the decomposition apparatus of the present invention also provides an excellent method for separating and recovering metals and/or inorganics.

According to an embodiment of the above examples of the present invention, as shown in FIG. 2(4), the wire mesh 16 having an opening to allow the catalyst 2 of largest size to pass through is positioned at right-bottom corner of the decomposition means 1 in plan view, (the wire mesh 16 is not shown in FIG. 2(4)). There is formed the concave portion 13 at peripheral area of the wire mesh 16, and the concave portion 13 connects with the charge opening 7. The concave portion 13 is equipped with the circulation means 5(D) to circulate the waste plastics and organics 4, charged from the charge opening 7, from the concave portion 13 to bottom-left corner of the decomposition means 1 in plan view. The paddle 12 is located at left-bottom corner and at right-top corner in the decomposition means 1 in plan view. The arrangement of these paddles 12 is not limited to that given in FIG. 2(4).

According to the above embodiment, the sieving operation is conducted corresponding to the mesh-opening of the wire mesh 16, thereby recovering the metals and inorganics left on the wire mesh 16 into the pocket 17, while the catalyst 2 is sieved down into the lower part of the concave portion, which is then recirculated in the reactor 3 together with newly charged waste plastics and organics 4 by the circulation means 5(D).

The driving force of the circulation means 5(D) according to the present invention is not specifically limited, and screw feeder, conveyer (especially, bucket conveyer), paddle, piston and the like may be applicable.

The position of the charge opening 7 and of the means for separating and recovering metals and/or inorganics 15 may be close with each other, or may be opposing from each other, as needed. A preferable embodiment adopts the positioning of the charge opening 7 and the means for separating and recovering metals and/or inorganics 15 at close positions with each other because the decomposition of waste plastics and organics immediately after charged preferably uses the catalyst 2 which does not contain the waste plastics and organics in the course of decomposition. The decomposition apparatus for waste plastics and organics of the present invention is an apparatus which can bring the catalyst 2 after circulated, (the catalyst which does not contain waste plastics and organics in the course of decomposition), to join the reaction of the newly charged waste plastics and organics. Different from the conventional decomposition apparatus, the apparatus of the present invention can decompose the waste plastics and organics at a high efficiency.

For the decomposition means 1 according to the present invention, the waste plastics and organics 4 are not charged from the top of the reactor 3 onto the surface of the catalyst 2, but are preferably charged from the charge opening 7 to inside the circulating catalyst 2, as shown in FIG. 1. The inventors of the present invention found that the direct charge of the waste plastics and organics 4 to inside of the catalyst 2 attains high efficiency decomposition effect. According to the decomposition means 1 of the present invention, however, decomposition is also attained when the waste plastics and organics 4 are charged from the charge opening 8 at top of the reactor 3 onto the surface of the catalyst 2.

Furthermore, according to the decomposition means 1 of the present invention, two or more charge openings may be given to allow conducting any of above charge methods. In addition, the charge openings 7 and 8 are not only used for charging the waste plastics and organics 4 but also can be used for charging the catalyst 2.

The charge openings 7 and 8 in the following Examples 2 and 3 are the same as those in above examples.

As illustrated in FIG. 3, the means for treating waste plastics and organics 1, (Example 2), of the present invention has at least the reactor 3 in which the catalyst 2 is accumulated, the agitation means 5(A), 5(B), and 5(C), which circulate the waste plastics and organics 4 charged into the reactor 3 together with the catalyst 2, the agitation means 6 which agitates the catalyst 2 and the waste plastics and organics 4, the charge opening 7, and the returning passage 20. The means for treating waste plastics and organics 1 preferably further has the air-supply blower 19 as the carrier gas (air) supply means, the air-blowing chamber 10, the heating means 9 for supplying heat necessary for decomposition reaction, and the vent opening 39.

As shown in FIG. 3, inside of the reactor 3 is divided into a first stage tank 31 and a second stage tank 32 which is located at higher position than the position of the first stage tank 31. The first stage tank 31 has a first permeable bottom 35 fixed in the reactor 3. The first permeable bottom 35 has an upstream end 33 at one end thereof in the longitudinal direction, (left side in FIG. 3), and a discharge end 34 at the other end thereof (right side in FIG. 3). The second stage tank 32 has a second permeable bottom 38 fixed in the reactor 3. The second permeable bottom 38 has a downstream end 36 at one end thereof in the longitudinal direction, and a charge end 37 at the other end thereof.

As illustrated in FIG. 3, the circulation means 5(A) is a screw feeder having the rotary shaft 14 equipped with the spiral blade 21, the rotary shaft being inserted into the first stage tank 31 in horizontal position along the longitudinal direction of the first stage tank 31. The circulation means 5(B) is a screw feeder in which the lower end portion of the rotary shaft 14 having the spiral blade 21 is positioned close to the discharge end 34 of the first stage tank 31, while the top end portion of the rotary shaft 14 is positioned upright close to the charge end 37 of the second stage tank 32. The circulation means 5(C) is the same as above circulation means 5(A) except that the circulation means 5(C) is positioned inside the second stage tank 32. Each of the rotary shafts 14 of the respective transfer means 5(A), 5(B), and 5(C) is rotated by a drive source M such as a motor.

As illustrated in FIG. 4, each of the first and second permeable bottoms 35 and 38 is a wire mesh having a circular arc shaped cross section opened upward. The wire mesh is a material which receives the catalyst 2 and which allows the gas to pass therethrough. The permeable bottom is, however, not limited to wire mesh. Although the first and the second permeable bottoms 35 and 38 are isolated by a partition wall 30 from each other, their upper faces are opened and connected inside the reactor 3. Furthermore, the air-blowing chamber 10 is located beneath the first and the second permeable bottoms 35 and 38.

In addition, as shown in FIG. 3, the second stage tank is located at a position higher than the position of the first stage tank. As a result, for returning the catalyst from the downstream end in the second stage tank to the upstream end in the first stage tank, no forceful transfer of the catalyst applying conveyer, screw feeder, and the like is required. The returning passage 20 is a chute which connects the upstream end 33 in the first stage tank 31 with the downstream end 36 in the second stage tank 32.

FIG. 4 does not show the spiral blade 21, showing a blade row 22 mounted as the agitation means to the rotary shaft 14 of the respective circulation means 5. The blade row 22 is formed by fixing three blades 81 to the rotary shaft 14 at a pitch of 120 degrees. With the configuration, the circulation means 5 circulates the waste plastics and organics 4 together with the catalyst 2, (circulation means), and agitates the catalyst 2 with the waste plastics and organics 4 favorably, (agitation means). As a result, the catalyst 2 and the waste plastics and organics 4 are prevented from becoming lumps in gaps between the spiral blades 21 independent of the shape of catalyst 2 either in powder shape or in granular shape. More preferably, the spiral blade 21 has an auxiliary blade.

Similar to the means for treating waste plastics and organics in Example 1, the wire mesh 16 having an opening to allow the catalyst 2 of large size to pass through as the means for separating and recovering metals and/or inorganics 15 may be fitted in the returning passage 20. With the configuration, the metals and/or inorganics can be separated and recovered similar to Example 1.

As illustrated in FIG. 5, according to another means for treating waste plastics and organics 1, (Example 3), the reactor 3 in a long size having the upstream end 33 at one end thereof in the longitudinal direction, and the downstream end 36 at the other end thereof has at least the circulation means 5, the agitation means 6 (not shown), the charge opening 8, and the returning passage 20. The reactor 3 preferably further has the air-supply blower 19 as the carrier gas (air) supply means, the heating means 9 which supplies heat necessary for decomposition reaction, the air-blowing chamber 10, and the vent opening 39.

The catalyst 2 is circulated between the upstream end 33 and the downstream end 36. When the waste plastics and organics 4 charged from the charge opening 8 to near the upstream end 33 in the reactor 3 is circulated from the upstream end 33 to the downstream end 36 in the reactor 3 together with the catalyst 2 by the circulation means 5, the waste plastics and organics 4 can be gasified in the course. FIG. 5 shows the reactor 3 in horizontal position. However, the reactor 3 may be tilted so as the downstream end 36 to become higher than the upstream end 33. In that case, the catalyst 2 which is transferred by the circulation means 5 to the downstream end 36 can be brought to slide down through the returning passage 20 by its own weight, thus returning to the upstream end 33.

Since the catalyst 2 is circulated by the circulation means 5 from the upstream end 33 toward the downstream end 36, the catalyst which reaches the downstream end 36 is guided by the returning passage 20 to return to the upstream end 33. As a result, the catalyst is circulated in the reactor so that the waste plastics and organics newly charged into the reactor can further be gasified by the action of the catalyst.

Although the catalyst which reaches the downstream end 36 is to return to the upstream end 33 by the screw feeder, paddle, bucket conveyer and piston may be applicable.

As illustrated in FIG. 6, a further means for treating waste plastics and organics 1, (Example 4), has at least the reactor 3 having the upstream end 33 at top of the drawing, and the downstream end 36 at bottom of the drawing, a cage 40 which can position waste plastics and/or organics, a charge opening 41 which allows the cage to charge into the reactor 3, and the returning passage 20. The means for treating waste plastics and organics 1 further preferably has the air-supply blower 19 as the carrier gas (air) supply means, the heating means 9 for supplying heat necessary for decomposition reaction, a mesh 42 which controls the amount of dropping catalyst, and the vent opening 39.

There may be installed an agitation apparatus in the vicinity of the upstream end 33 and of the downstream end 36 to assure uniform distribution of the catalyst. Further in FIG. 6, the carrier gas is directly supplied into the reactor. However, the carrier gas may be supplied into the reactor via an air-blowing chamber as in the case of Examples 1 to 3. The vent opening 39 also functions as the charge opening to charge the catalyst into the reactor. The catalyst charge opening, however, may be provided separately.

A cage 40 containing waste plastics and organics is placed in the reactor 3 through the charge opening 41. Then, during the course of dropping the catalyst from the upstream end to the downstream end in the reactor 3, the waste plastics and/or organics contact with the catalyst and are gasified.

Since the catalyst 2 drops (circulates) from the upstream end 33 to the downstream end 36, the catalyst which reaches the downstream end 36 is guided by the returning passage 20 to return to the upstream end 33. As a result, the catalyst 2 circulates in the reactor 3. The driving force for returning the catalyst 2, which reaches the downstream end 36, to the upstream end 33 guided by the returning passage 20 is a screw feeder which is structured by a rotary shaft, rotated by the driving source, having a spiral blade thereon, and being inserted into the returning passage. The driving force, however, is not specifically limited, and other driving force such as bucket conveyer, paddle and piston may be applied.

The cage 40 capable of positioning the waste plastics and/or organics is preferably a wire mesh which allows the flowing-down catalyst 2 to pass through, which does not allow the charged waste plastics and organics to pass through, and which does not allow the metals and inorganics which are mixed in the waste plastics or which are vapor-deposited or adhered to at least a portion of the waste plastics to pass through. For attaining further efficient contact between the catalyst 2 and the waste plastics and organics, the cage 40 may be rotated and/or vibrated in the reactor 3.

Even if fine waste plastics and organics pass through the cage 40 to drop onto the downstream end 36, the action of the catalyst 2 which reaches the downstream end 36 gasifies the waste plastics and organics.

The mesh 42 which controls the amount of dropping catalyst is preferably wire mesh, which uniformly flows down the catalyst 2 from the upstream end to the downstream end. The mesh 42 is preferably made by two or more sheets of wire mesh, and sliding of pluralities of wire meshes with each other controls the amount of flowing-down catalyst.

Different from the means for treating waste plastics and organics 1 in the above Examples 1 to 3, the means for treating waste plastics and organics 1 in Example 4 illustrated in FIG. 6 does not need the agitation means for agitating the catalyst with the waste plastics and organics. Accordingly, the size of the reactor 3 is designed small compared with the reactor size of the conventional decomposition apparatus. Furthermore, the waste plastics and organics can be placed in the cage 40 in the reactor 3 through the charge opening 41 without crushing them. As a result, there is no need of the crushing apparatus to crush the waste plastics and organics.

In addition, the means for treating waste plastics and organics 1 illustrated in FIG. 6 may bring to horizontal position as in the case of Example 1, (refer to FIG. 2). In this case, the screw feeder as the circulation means is applied to circulate the catalyst 2. Furthermore, the catalyst 2 may be circulated in the reactor 3 by rotating the cage 40 containing the waste plastics and organics 4. The operation increases the contact efficiency between the catalyst 2 and the waste plastics and organics 4, thereby conducting efficient decomposition of waste plastics and organics 4.

For any of the above described means for treating waste plastics and organics in above examples, the screw feeder has the following advantages. The screw feeder plays the role of the circulation means 5 and of the agitation means 6 at a time. Independent of the shape of catalyst 2 in powder or in granule, the screw feeder surely circulates the catalyst 2 without retaining at a position. Increase in the volume of catalyst 2 accumulated in the reactor 3 consumes considerably large torque to rotate the agitation blade. To this point, compared with the conventional agitation blade, the screw feeder can decrease the increased amount of torque to rotate the rotary shaft 14. Consequently, use of screw feeder as the circulation means 5 and/or the agitation means 6 is advantageous for increasing the capacity of the reactor 3 in the means for treating waste plastics and organics.

As another example, public known rotary kiln and apparatus comprising reactor, in which the several paddle place, can circulate the catalyst in the reactor.

The heating means 9 of any of above examples is the one to heat the supplied air or the like via the carrier gas supply means such as the air-supply blower 19. That is, in the step of supplying the air fed by the air-supply blower and the like into the air-blowing chamber 10, the heating means 9 heats the air to heat the catalyst to the catalyst-activation temperature necessary for the decomposition reaction. Although electricity is preferred as the heat source, the heat source is not specifically limited. Referring to FIG. 3, the hot air is supplied to the air-blowing chamber 10, and ascends through the fist permeable bottom 35 into the reactor 3. The heating means is required to increase the temperature of catalyst 2 to the catalyst-activation temperature at the beginning of the decomposition reaction. Once the decomposition reaction proceeds, however, the decomposition heat of the waste plastics and organics keeps the catalyst-activation temperature so that the heating means is not necessarily required after that period. For the case that the waste plastics and organics 4 generate small amount of heat, however, the heating means 9 heats the air supplied from the air-supply blower 19, as needed, to supply the heat to the reactor 3.

Any of the above air-blowing chamber 10 plays two roles of what is called the carrier gas supply tank and of a tank to supply heat necessary in the initial period of reaction. With the presence of the air-blowing chamber 10, a plurality of holes opened on the first permeable bottom 35 allows the carrier gas supplied from the air-supply blower 19 or the like to uniformly distribute to entire inside of the catalyst.

The means for treating waste plastics and organics 1 according to the present invention is preferably a spiral blade not intermittently divided, more preferably a spiral blade having small auxiliary blade between the pitches of the spiral blade, and most preferably a spiral blade with attached small auxiliary blade 85. The presence of the auxiliary blade 85 further increases the contact efficiency between the catalyst 2 and the waste plastics and organics 4.

Other than the above, the agitation means in any of the examples may be a spiral blade which is intermittently divided. That is, as shown in FIG. 7(*a*), if the spiral blade forms a plurality of notches 82 at appropriate positions, a portion of circulating powdery or granular catalyst 2 and waste plastics and organics 4 pass through the notch 82. The action induces the agitation of the powdery or granular catalyst 2 with the waste plastics and organics 4, thus playing the role of both the circulation means 5 and the agitation means 6. Alternatively, as shown in FIG. 7(*b*), the agitation means 6 may be a plurality of axial flow blades 83 which rotate centering on the rotary shaft 14 to give driving force to the powdery or granular catalyst 2 and the waste plastics and organics 4. In that case, the spiral blade may be eliminated, or a projected piece 84 may be attached to adequate position on the rotary shaft 14.

Furthermore, the apparatus for decomposing waste plastics and organics according to the present invention contains a means for treating oxidation catalyst adding to the above means for treating waste plastics and organics, and preferably contains a lime neutralization treatment means.

The lime neutralization treatment means is a means (apparatus) for adsorbing to remove hydrogen chloride, sulfur compounds, hydrogen fluoride, cyan gas, nitrogen-containing compounds, and the like generated in the decomposition treatment step, thus not to emit them into atmosphere.

Specifically the means uses a lime material consisting mainly of quicklime, slaked lime, or their mixture, which lime material is then molded to 2 mm or larger porous pellet of hydrogen chloride-absorber. Thus prepared pellets are packed in a removal vessel. The above-described waste plastics-originated hydrogen chloride, sulfur compounds, hydrogen fluoride, cyan gas, nitrogen-contained compounds, and the like are brought to pass through the removal vessel, thus letting the hydrogen chloride, sulfur compounds, hydrogen fluoride, cyan gas, nitrogen-contained compounds, and the like react and absorb into the pellets.

The lime material according to the present invention may be quicklime, slaked lime, or a mixture of them. It is preferred that the lime material be molded to 2 mm or larger porous pellet. The method for molding the pellets is arbitrary, and simple kneading with water to dry or to fire may be applied. For examples, powder of lime material is mixed with water to a moldable hardness, which is then extruded from an extruder to cut into pellets.

The shape of the pellet is arbitrary, and spherical, disk, circular cylinder shapes may be adopted. The size of pellet is 2 mm or larger. If the size is smaller than 2 mm, the pellets become close to powder, which raises problems on apparatus caused by pressure loss of air, on emission and entrainment of powder, on filter, and the like. Although large pellets can be used in principle, increased size decreases efficiency. For practical applications, size of 10 mm or smaller is preferable, and an experiment given by the inventors of the present invention showed a favorable range of size from 3 to 7 mm.

The lime material used in the "lime neutralization treatment means" according to the present invention prefers to use quicklime rather than slaked lime. The finding was derived from a measurement of chlorine-fixing rate using lime materials (porous quicklime and slaked lime) given by the inventors of the present invention.

The water content (ppm) in the lime material is preferably small to 20% or less, and more preferably 10% or less. The finding was derived from a measurement for various water contents in lime materials (slaked lime and quicklime) given by the inventors of the present invention.

The heating temperature of the lime material in the lime neutralization treatment means is preferably from 150° C. to 500° C., more preferably from 200° C. to 400° C., and most preferably from 250° C. to 350° C. The finding was derived from calculation of the theoretical chlorine-fixing concentrations. In the related art, the adsorption treatment of hydrogen chloride and the like is conducted at normal temperature and using slaked lime. The incineration furnace or the like in the related art conducts the adsorption treatment of hydrogen chloride and the like after decreasing the temperature of flue gas after combustion. Since the powder of slaked lime is used in the related art, the handling of slaked lime is troublesome, and the apparatus is large using bag filters with large area and in switching operation. In the decomposition apparatus according to the present invention, however, the adsorption and removal treatment of the lime material can be done at the flue gas temperature after the decomposition reaction.

The lime neutralization treatment means may be the one in which the pellets drop from top of the packed tank toward the bottom thereof, while the gas to be treated flows from bottom to top while contacting with the lime pellets. A pellet-stock portion is located at upper portion of the packed tank, and a discharge portion for the used pellets is located at lower portion of the packed tank. The packed tank is isolated from the reaction vessel tank by a shutter, a rotary valve, or the like. The discharge rate is controlled by the treatment concentration and the treatment rate. The lime neutralization treatment means is provided with a heater to prevent deliquescence phenomenon. The decomposition apparatus conducts the treatment at a high temperature so that no deliquescence phenomenon appears. Nevertheless, a heater means is preferably applied to respond to the non-heating state.

The above decomposed waste plastics and organics have a possibility of being not-perfectly decomposed, and that the non-reacting matter and intermediate products may leave the means for treating waste plastics and organics. Accordingly, the "means for treating oxidation catalyst" of the present invention has the succeeding oxidation catalyst treatment step to conduct further oxidation or decomposition. The oxidation catalyst treatment step is preferably given after the lime neutralization treatment step.

The oxidation catalyst is the one which generally initiates oxidation and decomposition reactions at lower temperature and shorter time than those in the case of non-catalytic reactions. There are varieties of known oxidation catalysts of that type, and they are commercially available. Generally the reaction temperature is in a range from 200° C. to 500° C. According to the present invention, however, 300° C. or above, and preferably 350° C. or above, is adopted. That is because, for the case of decomposition of varieties of waste plastics and organics, the generated non-decomposed gas is not necessarily a single substance. Therefore, 350° C. or higher temperature is preferred to completely decompose mixed non-decomposed gases. From the point of efficiency and of effectiveness of apparatus, the present invention prefers a honeycomb type catalyst.

Platinum catalyst is suitable for a reaction converting carbon monoxide to carbon dioxide, and for decomposition of lower hydrocarbons and VOCs (volatile organic compounds). Palladium catalyst is suitable for methane gas decomposition. As of these catalysts, palladium and platinum catalysts are preferred in the present invention. The treatment order of application of them is preferably palladium catalyst followed by platinum catalyst.

The oxidation catalyst affects considerably the oxidation of non-combustion substances such as carbon monoxide and hydrocarbons. With oxygen and at a certain temperature, almost all the substances are immediately oxidized to decompose. Carbon monoxide becomes carbon dioxide, and hydrocarbons become carbon dioxide and water.

The decomposition apparatus according to the present invention can have one or more of the following-described means, (refer to FIG. 8).

(1) Alumina Catalyst Treatment Means

The method for decomposing waste plastics according to the present invention preferably adopts the "alumina catalyst treatment means" before the oxidation catalyst treatment step. The alumina catalyst treatment means prevents adhesion of Si, Mg, Cr, Pb, Fe, and the like, or dust or the like to the oxidation catalyst. The alumina catalyst is preferably positioned before the oxidation catalyst tank. An alumina catalyst tank may be installed separately. The heating temperature of alumina catalyst is preferably 350° C. or above.

(2) Crushing Means

The crushing means according to the present invention is a means (apparatus) which crushes waste plastics and organics to a size (pieces) suitable for the reactor of the means for treating waste plastics and organics. Accordingly, the crushing means is not specifically limited if only the means can crush the waste plastics and organics. Preferably, however, the crushing means has a capacity being able to crush corrugated cardboard, and in particular for the case of treating infectious treatment articles in the medical field, the crushing means preferably has two-stage shutter and has sterilization lamp.

(3) Carrier Gas Supply Means

The carrier gas supplied to the reactor is preferably oxygen. Normally, however, air is applied. Alternatively, an inert gas may be applied as needed. The method for supplying the carrier gas uses the air-supply blower 19 and the like, and supplies the carrier gas distributing uniformly into the titanium oxide granules. The supply rate is preferably 1.3 to 4.0 times the theoretically required oxygen amount using air at normal temperature, containing oxygen by an amount necessary for oxidation and decomposition of the decomposing organics. From the point of decomposition efficiency, 1.6 to 3.0 times thereof is preferred. Although blower and the like can be used, they are not specifically limited.

For example, a plurality of holes are provided on the bottom of the reactor 3, through which holes oxygen or the like is supplied. According to the means for treating waste plastics and organics of the present invention, the carrier gas, preferably air, is directly supplied into the catalyst circulating in the reactor through the pluralities of holes opened on the bottom of the reactor, which significantly increases the decomposition efficiency compared with the conventional method of supplying the carrier gas from top of the reactor.

Dust Collection Means

The dust collection means according to the present invention recovers metals and inorganics and/or catalyst discharged and scattered from the reactor in the means for treating waste plastics and organics. The recovered catalyst can be reused. As shown in FIG. 8, preferably the dust collection means has two of them sandwiching the lime neutralization treatment means. Furthermore, the first dust collection means is preferably a cyclone dust collection means (apparatus), and the second dust collection means is preferably a dust collection means (apparatus) equipped with bag filter.

(4) Cyclone Dust Collection Means (First Dust Collection Means)

The catalyst recovered by the first dust collection means is collected by a cyclone, and then is recycled to the reactor through the returning passage connected to the reactor, thereby utilizing for the catalyst circulation. The inventors of the present invention confirmed, by an experiment, that the first dust collection means recovers about 95% to about 99% of the catalyst.

(5) Dust Collection Means Equipped with Bag Filter, (Second Dust Collection Means)

If the catalyst recovered by the second dust collection means is fine powder, the catalyst can be returned to the reactor after forming the fine powder catalyst to dumplings of a desired size.

(6) Heat Exchange Means

The heat exchange means is a means for recovering heat from a hot air containing carbon dioxide and trace amount of water through the heat exchange. The obtained heat source can be utilized in the heating means, though the use thereof is not specifically limited. For example, the uses thereof include the heating of supply air, the supply to a preheater, the supply to hot water in the plant facilities, or to melt snow.

(7) Preheater Means

Before the oxidation catalyst treatment, preheating (preliminarily heat holding) is preferred by a heater means. The preheating is suitable for the oxidation catalyst to surely act in the reaction in the case of low concentration gas or of low heat generation in the decomposition tank.

(8) Exhaust Blower Means

The exhaust blower means is a means to discharge a safe air containing carbon dioxide gas and trace amount of water, generated by decomposition of waste plastics and organics, to outside the decomposition apparatus for the waste plastics and organics of the present invention.

(9) Cooling Means

The cooling means is a means to cool the catalyst in the reactor in the case that the reactor exceeds the optimum activation temperature zone of the catalyst. The cooling method recovers the heat from the reactor preferably by flowing cooling water external or internal of the reactor, (preferably using latent heat or heating the cooling water). The method is, however, not specifically limited, and cooling water may be introduced into blade or the like.

(10) Heat Recovery Means

The heat recovery means is a means to hold or utilize the heat obtained from the cooling water. The recovered heat can be used in hot-water supply in the plant facilities or in melting snow. The uses of the recovered heat are, however, not limited to those given above.

(11) HCl Continuous Measurement Means

The HCl continuous measurement means is a means to confirm whether the HCl is absorbed and removed by the lime neutralization treatment means. That is, the means prevents the HCl concentration at or above specified level from emitting outside the decomposition apparatus for waste plastics and organics of the present invention.

(12) CO Continuous Measurement Means

The CO continuous measurement means is a means to confirm whether the oxidation catalyst treatment means converts CO into carbon dioxide. That is, the means prevents the CO concentration at or above specified level from emitting outside the decomposition apparatus for waste plastics and organics of the present invention.

(13) Alarm Means

Although the decomposition apparatus of the present invention conducts safe operation conforming to the legal regulations, the apparatus stops operation if the safe zone is overridden even to a slight degree. That is, the alarm means notifies the abnormality when the measurements in the HCl continuous measurement means and/or the CO continuous measurement means detect CO or HCl concentration above the standard level even at a slight degree. Preferably, in case of abnormality detection, toxic gases are not allowed to emit outside the apparatus using a safety means (apparatus).

Decomposition System of Waste Plastics and Organics of the Present Invention

The decomposition system of waste plastics and organics of the present invention uses any of the above-described decomposition apparatuses, and furthermore uses favorable catalyst and/or favorable decomposition condition to conduct the decomposition of waste plastics and organics.

The decomposition system of waste plastics and organics of the present invention can use a decomposition apparatus given in FIG. 11, containing the conventional means for treating organics, having a batchwise reactor, thus conducting the decomposition of waste plastics and organics using further suitable catalyst and decomposition condition, (refer to FIG. 10).

The "heating temperature of catalyst" according to the present invention needs at least 300° C. or above and 600° C. or below, preferably 350° C. or above, more preferably from 420° C. to 560° C., specifically preferably from 450° C. to 530° C., and most preferably about 480° C.

The heating temperature is the catalyst temperature in the reactor to bring the catalyst and the waste plastics and/or organics into reaction condition, and is the set temperature to keep the set temperature of catalyst. That is, even when the set temperature is 480° C., the range of fluctuation of the catalyst temperature in the reactor becomes about ±30° C. from the set temperature.

Furthermore, at a certain position in the reactor, the temperature may become higher or lower than the specifically preferred "heating temperature of catalyst" of the present invention depending on the shape and size of the reactor. Since, however, the catalyst is circulating in the reactor, only requirement is for the most part of the catalyst to maintain the more preferable heating temperature of catalyst.

The catalyst (catalyst 2) of the present invention is preferably the one made by titanium oxide granules containing titanium oxide as the active ingredient. The catalyst composed of titanium oxide granules is not only the titanium oxide granules made only of titanium oxide as the active ingredient, but also includes granules of a mixture of titanium oxide with at least one of aluminum oxide and silicon oxide, (hereinafter also referred to as the "titanium oxide mixture"). As already known, since the titanium oxide has a function of photocatalyst, the decomposition of waste plastics and organics using any of above catalysts may be conducted, as needed, by irradiating light, specifically irradiating ultraviolet light, while heating and agitating the catalyst and the waste plastics and organics. However, for the case of decomposition of single article of varieties of waste plastics and organics, or decomposition of varieties of materials containing their solid, liquid, or containing metals or inorganics, the irradiation of ultraviolet light achieves little effect in terms of practical application.

To this point, the decomposition system for waste plastics and organics according to the present invention allows the decomposition of waste plastics and organics at high efficiency without applying light irradiation by the use of a suitable decomposition apparatus, by the optimization of decomposition condition, and by the use of suitable catalyst.

The titanium oxide granules are manufactured by drying a sol of titanium oxide to a gel of titanium oxide, which gel is then fired in a temperature range from 450° C. to 850° C., which fired product is then crushed and is edge-treated. The granules of a mixture of titanium oxide are manufactured by mixing and drying the sol of titanium oxide and at least one of alumina sol and silica sol to prepare a gel, which gel is then fired in a temperature range from 450° C. to 850° C., which fired product is then crushed and is edge-treated. The titanium oxide is preferably an anatase-type titanium oxide.

The shape of the titanium oxide granules used in the decomposition system for waste plastics and organics according to the present invention is 3.5 mesh (5.60 mm) or smaller, and preferably 10 mesh (1.70 mm) or smaller.

More preferably, the shape of the titanium oxide granules before use is from 5.60 mm to 110 μm, or from 3.50 mm to 150 μm.

A preferred shape of the titanium oxide granules or the granules of mixture of titanium oxide in the conventional decomposition method for waste plastics is the one having a particle size distribution in which the percentage of particles having 0.5 to 1.18 mm in size is 50 to 95% by weight, and the percentage of particles having 1.18 to 1.7 mm in size is 5 to 50% by weight, and having 2.0% or less of abrasion rate; and more preferably the one having a particle size distribution in which the percentage of particles having 0.5 to 1.18 mm in size is 60 to 90% by weight, and the percentage of particles having 1.18 to 1.7 mm in size is 10 to 40% by weight, and having 1.0% or less of abrasion rate.

However, the applicable shape of the titanium oxide granules used in the decomposition apparatus and the decomposition system for waste plastics and organics according to the present invention is widened to a broad range beyond the limitation of shape and particle size of the titanium oxide granules which were accepted in the above conventional method owing to the optimization of the conditions in the decomposition step and owing to the use of the treatment apparatus for waste plastics and organics described in the examples. As a result, the titanium oxide granules having sizes not applicable in the conventional method can be used, and the simplification of process and manufacturing method of titanium oxide is attained.

Naturally the above conventional granules are applicable for decomposing the waste plastics and organics.

As described above, the "catalyst composed of titanium oxide granules" according to the present invention is the titanium oxide granules or granules of a mixture of titanium oxide, have shapes of 3.5 mesh (5.60 mm) or smaller, preferably 10 mesh (1.70 mm) or smaller, and have 2.0% or less, preferably 1.0% or less, of abrasion rate after edge-treatment. As a result, the present invention allows waste plastics and organics to be decomposed at high efficiency over a long period of time by using the above-described catalyst.

The method to manufacture the granules having above shapes is not specifically limited. For example, as described above, the granules having the above sizes may be prepared by firing gel, by crushing the fired product, by edge-treating the crushed product, followed by sizing (using sieves having the respective mesh sizes), or after edge-treatment, sizing to mix to an adequate sizes, thus obtaining the granules having above shape.

Among the titanium oxides prepared by varieties of methods, the titanium oxide prepared by drying a sol of titanium oxide to a gel of titanium oxide, which gel is then fired at temperatures in a range from 450° C. to 850° C., as described above, provides excellent performance as the decomposition catalyst for waste plastics. As crushed state, however, the catalyst is easily abraded to generate fine powder, thus increasing the loss.

To this point, according to the present invention, the crushed fired-gel of titanium oxide is subjected to edge-treatment to preliminarily eliminate sharp corners, thus significantly reducing the abrasion rate. As a result, the waste plastics and organics can be decomposed at high efficiency, and also the catalyst keeps its preferable shape to maintain the high catalyst efficiency over a long period of time. The effect is the same to the catalyst composed of granules of a mixture of titanium oxide. That type of edge-treatment is conducted by, for example, crushing a gel of titanium oxide or a gel mixture of the gel of titanium oxide and at least one gel of alumina and silica, which crushed product is then treated by a rolling granulation apparatus which is known as a granulator. The apparatus is, however, not limited to the rolling granulation apparatus.

The abrasion rate of the titanium oxide granules used in the decomposition system of the present invention is determined by the following method.

The determination is given by the abrasion rate tester illustrated in FIG. 9. The abrasion rate tester is composed of a sample vessel 801 having 63 mm in inner diameter and 86 mm in depth, equipped with an agitator 802. The agitator has a structure of a shaft body 803, three-piece agitation blades 804 in elliptical shape having 20 mm in length, attached to the lower end portion of the shaft body 803 at a circular distance of 60° extending in the radial direction from the shaft body. The agitation blade inclines by 45° from the horizontal direction, while positioning the lowermost edge thereof at 8 mm above the bottom of the sample vessel.

The procedure for determining the abrasion rate of the titanium oxide granules is the following. A 150 mL of titanium oxide granules is measured by a 200 mL measuring cylinder, and the weight is recorded. All the weighed contents is charged into a sample vessel. After agitating the contents by the agitator at 300 rpm for 30 minutes, all the contents is taken out from the sample vessel, and is put on a sieve having 0.5 mm of opening. The sample passed the sieve is weighed. The abrasion rate A of the sample is defined as $A=(W/W_0) \times 100$ (%), where the W is the sample weight passed the 0.5 mm opening sieve, and $W_0$ is the sample weight for the measurement.

The "catalyst composed of the titanium oxide granules" according to the present invention has the specific surface area of titanium oxide as the active ingredient of 30 m$^2$/g or more, preferably in a range from 33 to 65 m$^2$/g, and more preferably from 35 to 50 m$^2$/g. Also, the specific surface area of titanium oxide as the active ingredient before use is preferably from 35 to 50 m$^2$/g. Larger specific surface area increases more the contact area with the waste plastics, and increases the decomposition efficiency. However, excessively large specific surface area deteriorates the heat resistance, and likely collapsing the granule to lead to powdering.

The method for determining the specific surface area of the catalyst composed of titanium oxide granules can use known methods. Among these methods, the present invention uses the BET method, which is described below in detail.

The BET method determines the specific surface area of sample by bringing molecules having a known adsorption occupying area to be adsorbed onto the surface of powder particles at liquid nitrogen temperature, and the adsorbed amount is measured to obtain the specific surface area.

The present invention adopts the specific surface area meter Model 2300 Automatic testing apparatus manufactured by Shimadzu Corporation.

The "catalyst composed of titanium oxide granules" according to the present invention has the micropore volume of the titanium oxide as the active ingredient in a range from 0.05 to 0.70 cc/g, and preferably from 0.10 to 0.50 cc/g.

The method for determining the micropore volume of the catalyst composed of titanium oxide granules may be known methods. Among these methods, the present invention adopts the mercury intrusion method, which method is described below in detail.

The mercury intrusion method determines the micropore volume utilizing the large surface tension of mercury. That is, pressure is applied to intrude the mercury into micropore of the powder, and the micropore volume is determined based on the applied pressure and the intruded mercury amount.

The present invention uses a porosimeter (mercury intrusion method, maximum pressure of 200 MPa) manufactured by Thermo Finnigan.

According to the decomposition system of the present invention, if the amount of waste plastics and/or organics is small compared with the amount of titanium oxide granules, the waste plastics and organics are readily decomposed, and the heat for maintaining the suitable temperature for decomposition of the titanium oxide utilizing the decomposition reaction heat becomes insufficient, which requires the heating from outside, thus deteriorating the energy efficiency. If, however, the amount of waste plastics and/or organics increases compared with the amount of the titanium oxide granules, the treating materials exceeding the capacity of contact decomposition of the titanium oxide granules become non-decomposed gas, or further result in loss of activity caused by covering the surface of the titanium oxide by the organics, thereby failing in decomposing the materials.

To this point, by selecting suitable amount of the titanium oxide granules and the amount of the treating waste plastics and/or organics, the decomposition reaction heat is utilized to maintain the suitable temperature for the decomposition of titanium oxide, thus minimizing the externally supplying energy. In addition, surplus reaction heat above the suitable temperature for decomposition can be recovered and reused through the cooling-control of the reactor. For example, the heat can be recovered in a form of steam and hot water. Therefore, the recovered heat can be utilized in hot water supply to the plant facilities or in melting snow. The uses of the recovered heat are, however, not limited to those given above.

The throughput of waste plastics per hour is 3.0 to 40.0 kg, preferably from 6.0 to 35.0 kg, to 100 kg of the titanium oxide granules of the present invention.

As described above, the decomposition system according to the present invention can combine: the oxidation and decomposition by titanium oxide; the removal of hydrogen chloride, hydrogen fluoride, sulfur compounds, nitrogen-containing compounds, and the like using the lime neutralization treatment; removal of dust and the like by the alumina catalyst treatment; and/or further oxidation and decomposition by an oxidation catalyst.

The decomposition system for waste plastics and organics according to the present invention is illustrated in FIG. 10. As given in FIG. 10, the decomposition system of the present invention can contain, adding to the above-described steps, the air-supply step, the cooling step using cooling water, the emitted titanium oxide recovery and reuse step using cyclone separator, the heat exchange step using heat exchanger, the dust collection step to remove fine powder, the exhaust gas step using exhaust blower, the exhaust gas safe control step using hydrogen chloride detector, and the exhaust gas safe control step using CO detector.

The above individual steps can be naturally eliminated or modified.

Furthermore, the decomposition system for waste plastics and organics according to the present invention may adopt the "means for separating and recovering metals and/or inorganics". The waste plastics and decomposed materials which are oxidized or decomposed by the above heated catalyst may contain metals such as stainless steel, iron, aluminum, and copper, and inorganics, and may have vapor-deposited or adhered metals on the surface thereof. Those kinds of metals are not decomposed, different from the waste plastics and organics, and enter the catalyst to accumulate in the reactor. Therefore, the means for separating and recovering metals and/or inorganics separates and recovers the metals and inorganics from the catalyst. Not only the waste, there are many materials in which the plastics or organics integrating with metals and inorganics. The present invention is able to decompose only the plastics or organics in the materials integrating with metals and inorganics, thus taking out the metals and inorganics.

For the means for separating and recovering metals and/or inorganics, for example, a sieve having an opening to allow the granular titanium oxide catalyst of largest size to pass through is located in the reactor or in the returning passage of the reactor. When only the metals and inorganics caught by the wire mesh are taken out, the metals and inorganics left in the reactor become minimum volume. Alternatively, the catalyst and the metals and inorganics may be separated from each other by the difference in the specific gravity. Metals such as aluminum thin foil which have smaller specific gravity than that of catalyst float above the catalyst during the step of agitating the titanium oxide catalyst, thus they are selectively recovered. If the recovering metal is a magnetic one, magnetism or magnetic field may be used to separate the metal from the catalyst. The method for separating metals from catalyst is not limited to above described ones.

The waste plastics and organics applicable to the decomposition apparatus and the decomposition system according to the present invention are not specifically limited, and, adding to the general-purpose thermoplastic plastics such as polyethylene and polypropylene, the thermosetting plastics can be decomposed and gasified by the method of the present invention. Although the waste plastics and organics are preferably crushed to several cubic millimeters and to a size larger than the catalyst, in view of decomposition efficiency, they are also able to be decomposed without crushing. The shape of them is not specifically limited, and the shape includes film shape and solid plastics.

The materials which can be decomposed by the decomposition system for waste plastics and organics according to the present invention are not specifically limited, including organics, and examples of these applicable materials are: plastics including polyethylene, polypropylene, polyester, polyethyleneterephthalate, polystyrene, polycarbonate, polyurethane, polyvinylchloride, Teflon®; diaper; artificial dialyzer; anticancer drugs; treated articles relating to gene research; information-relating device terminals; confidential information-relating devices (such as CD-R); waste plastics generated from automobiles and household electric appliances; valuable metal recovery; and separation of organics from metals and inorganics. For the case of medical waste, there are often existing metals such as stainless steel, aluminum, and iron depending on the uses, or existing vapor-deposited or adhered metals on the surface thereof. The waste plastics do not limit the used plastics but also include non-used but unnecessary plastics and organics.

The examples describe the process to treat the medical waste such as used syringes, packages, or bottles, which are discarded by hospitals and the like using the means for treating waste plastics and organics. The elements described before apply the same name or same reference symbol.

Example 1

The air-supply blower 19 or the like as the carrier-gas supply means supplies air to the reactor 3. Then, the heating means 9 is actuated to heat the air supplied by the carrier-gas supply means. The heated air (hot air) is supplied into the reactor 3 containing the catalyst 2, thereby increasing the temperature of the catalyst 2 to a range from 420° C. to 560° C.

The crushing apparatus shown in FIG. 8 crushes medical waste to a size of several cubic millimeters and of larger than the size of the catalyst. The crushed medical waste is charged from the charge opening 7 of the reactor 3 into the concave portion 13, (refer to FIG. 2(4)). The charged medical waste circulates together with the catalyst 2 in the reactor by the action of the circulation means 5(D) and the circulation means 5. In the circulation step, the catalyst 2 and the medical waste are continuously agitated by the screw feeder as the agitation means 6, thus the contact between the catalyst 2 and the medical waste is repeated, which enhances the decomposition of waste plastics and organics 4 in the medical waste by the action of the catalyst 2. Through the process, all the waste plastics and organics 4 in the medical waste charged into the reactor 3 are gasified in the catalyst circulation step. During the gasification process of the waste plastics and organics 4, the decomposition of them generates gas consisting mainly of carbon dioxide and water vapor.

The gas (gasified organics) is sent to the lime neutralization treatment means and then to the oxidation catalyst treatment means. The step of removing toxic ingredients in the exhaust gas is not described in the example.

In the above circulation step, the waste plastics and organics 4 occupying the medical waste are gasified. The metals existing in the medical waste, however, are left behind in the catalyst 2 even after the circulation. Those metals may further be brought to be separated together with the catalyst 2 in the circulation step. For example, the wire mesh 16 having an opening to allow the catalyst 2 of largest size to pass through is inserted in the reactor as the means for separating and recovering metals and/or inorganics, (refer to FIG. 2(4)). Then, the pocket 17 which can recover the metals and inorganics caught by the wire mesh is located, thus recovering the metals and inorganics from the pocket.

Therefore, according to the means for treating waste plastics and organics of the present invention, the metals and inorganics in the medical waste are not left in the reactor 3, and are brought into recycle use while suppressing the oxidation of the metals. Furthermore, on separating the metals by the means for separating and recovering metals and/or inorganics, there is no need to stop the circulation means 5 and/or the agitation means 6 so that the throughput of the medical waste maintains a high level. In addition, when the means for separating and recovering metals and/or inorganics 15 separates metals, there is no need to open the door of the reactor 3 so that the thermal efficiency of the means for treating waste plastics and organics maintains a high level.

Example 2

The charge opening 7 of the reactor 3, shown in FIG. 3, is opened, and the catalyst 2 is let flow down to near the upstream end 33 in the first stage tank 31. At the same time, the circulation means 5 is actuated. Thus, the circulation means 5(A) transfers the catalyst 2 firstly toward the discharge end 34 of the first stage tank 31, and to the lowermost end of the rotary shaft 14 of the circulation means 5(B). Succeedingly, the circulation means 5(B) pushes up the catalyst 2 to the charge end 37 of the second stage tank 32, and finally the circulation means 5(C) transfers the catalyst 2 to the downstream end 36 in the second stage tank 32. At this moment, the catalyst 2 exists and circulates in the circulation passage from the upstream end 33 in the first stage tank 31 to the downstream end 36 in the second stage tank 32.

When the circulation means 5 is kept operating while flowing down the catalyst 2 as described above, the catalyst 2 slides down through the returning passage 20 by its own weight, then returns to the upstream end 33 in the first stage tank 31. The flowing down of the catalyst 2 is stopped when the volume or mass of the catalyst 2 accumulated in the circulation passage reaches a desired value. After closing the charge opening 7, the heating means 9 heats the catalyst 2 in the reactor 3 to a range from 420° C. to 560° C. Since the catalyst is not deteriorated even retaining in the reactor, the succeeding decomposition operation can begin from the step of heating the catalyst 2 in the reactor 3.

Next, the crushing apparatus shown in FIG. 8 crushes medical waste to a size of several cubic millimeters and of larger than the size of the catalyst. The crushed medical waste is charged from the charge opening 7 into near the upstream end 33 in the first stage tank 31. The circulation means 5 circulates the medical waste together with the catalyst 2 through the circulation passage. In the circulation step, the catalyst 2 and the medical waste are continuously agitated by the screw feeder as the agitation means 6, thus the contact between the catalyst 2 and the medical waste is repeated, which enhances the decomposition of organics in the medical waste by the action of the catalyst 2. Through the process, all the organics 4 in the medical waste charged into the reactor 3 is gasified during the circulation between the upstream end 33 in the first stage tank 31 and the downstream end 36 in the second stage tank 32. During the gasification process of the organics, the decomposition of them generates gas consisting mainly of carbon dioxide and water vapor.

When the catalyst 2 reaches the downstream end 36 in the second stage tank 32, the catalyst 2 slides down through the returning passage 20 to return to the upstream end 33 in the reactor 3, thereby the catalyst 2 circulates in the reactor 3. Accordingly, when medical waste which is crushed by the crushing means is newly charged into the reactor 3, the same catalyst 2 is able to repeatedly gasify the organics in the newly charged medical waste. Since the position of the second stage tank 32 is higher than the first stage tank 31, returning the catalyst 2 from the downstream end 36 in the second stage tank 32 to the upstream end 33 in the first stage tank 31 is performed without forceful use of conveyer, screw feeder, and the like.

The above gas (gasified organics) is sent to the lime neutralization treatment means, and then to the oxidation catalyst treatment means. The step of removing toxic ingredient in the exhaust gas is not described in the example.

In the above circulation step, the organics occupying a large portion of the medical waste are gasified. The metals existing in the medical waste, however, are left behind in the catalyst 2 even at the downstream end 36 in the second stage tank 32. Those metals may further be brought to be separated together with the metals in the step of circulating the catalyst 2. For example, the wire mesh 16 having an opening to allow the catalyst 2 of largest size to pass through is inserted in the returning passage 20 as the means for separating and recovering metals and/or inorganics 15. In this case, the returning passage 20 may be located outside the reactor 3 so as the metals caught by the wire mesh not to expose to the high temperature gas. Thus, when the metals caught by the wire mesh are taken out by opening the returning passage 20, the metals can be removed from the catalyst 2 before the metals enter the medical waste being newly charged into the reactor 3.

The present invention is able to be carried out in modes after applying varieties of improvements and modifications based on the knowledge of persons skilled in the art within a range not to depart from the scope of the present invention. For example, there is a case of not needing the circulation means 5(B). For instance, the first permeable bottom 35 is located in a tilting position so as the discharge end 34 to become higher than the upstream end 33, thereby letting the catalyst 2, which is transferred by the transferring means 5 to the discharge end 34 of the first permeable bottom 35, down directly to the charge end 37 of the second permeable bottom 38.

Example 3

The charge opening 8 shown in FIG. 5 is opened, and the catalyst 2 is let flow down to near the upstream end 33. At the same time, the circulation means 5 is actuated. Thus, the circulation means 5 transfers the catalyst 2 firstly from the upstream end 33 toward the downstream end 36. At this moment, the catalyst 2 exists and circulates in the circulation passage from the upstream end 33 to the downstream end 36.

The flowing down of the catalyst 2 is stopped when the volume or mass of the catalyst 2 accumulated in the circulation passage reaches a desired value. After closing the charge opening, the heating means 9 heats the air supplied by the air-supply blower 19, and supplies the hot air to the reactor 3, thereby heating the catalyst 2 in the reactor 3 to a temperature range from 420° C. to 560° C. Since the catalyst is not deteriorated even retaining in the reactor, the succeeding decomposition operation can begin from the step of heating the catalyst 2 in the reactor 3.

Next, the crushing apparatus shown in FIG. 8 crushes medical waste to a size of several cubic millimeters and of larger than the size of the catalyst. The crushed medical waste is charged from the charge opening 8 into near the upstream end 33. The circulation means 5 circulates the medical waste together with the catalyst 2 through the above circulation passage. In the circulation step, the catalyst 2 and the medical waste are continuously agitated by the screw feeder as the agitation means 6, thus the contact between the catalyst 2 and the medical waste is repeated, which enhances the decomposition of organics in the medical waste by the action of the catalyst 2. Through the process, all the organics 4 in the medical waste charged into the reactor 3 are gasified during the circulation between the upstream end 33 and the downstream end 36. During the gasification process of the organics, the decomposition of them generates gas consisting mainly of carbon dioxide and water vapor.

When the catalyst 2 reaches the downstream end 36, the catalyst 2 slides down through the returning passage 20 to return to the upstream end 33 in the reactor 3, thereby the catalyst 2 keeps circulating in the reactor 3. Accordingly, when medical waste which is crushed by the crushing means is newly charged into the reactor 3, the same catalyst 2 is able to repeatedly gasify the organics in the newly charged medical waste.

The above gas (gasified organics) is sent to the lime neutralization treatment means, and then to the oxidation catalyst treatment means. The step of removing toxic gas in the exhaust gas is not described in the example.

Preferably the returning passage 20 has the means for separating and recovering metals and/or inorganics 15, and connects the downstream end 36 in the reactor 3 with the upstream end 33 therein. As described below in detail, the separation means 15 separates the remained metals and inorganics from the catalyst 2 transferred to the downstream end 36. The returning passage 20 returns the catalyst 2, from which the metals are removed by the separating and recovering means 15, to the upstream end 33.

The separation means 15 is the wire mesh 16 having an opening to allow the catalyst 2 of largest size to pass through, and is inserted in the course of the returning passage 20. When the amount of metals caught by the wire mesh reaches a certain volume, the returning passage 20 is opened to take out the metals and/or inorganics, which passage 20 does not allow the metals in the waste plastics and organics 4 to remain in the reactor 3, while suppressing the oxidation of metals, thus realizing the recycle use of the metals.

With thus described apparatus for treating waste plastics and organics, the metals (aluminum, Al) of 98.9% of average purity were recovered. A sheet of plastic film with vapor-deposited Al thereon was crushed to about 5 cm square pieces, which pieces were then mixed and agitated with the catalyst (titanium oxide) 2 in 1 to 3 mm of size, heated to about 480° C., to circulate in an apparatus for treating waste plastics and organics for 10 minutes. At every one circulation of the catalyst 2 in the means for treating waste plastics and organics 1, thin Al pieces having several square centimeters in size were recovered. The recovered plastics pieces were decomposed to gasify, and high purity aluminum metal was recovered. Shorter circulation time expects higher purity of recovered metal.

Embodiments and examples for the apparatus for treating waste plastics and organics according to the present invention are described above. The present invention is, however, not limited to above embodiments. According to the above examples, the metal pieces are left on the wire mesh. However, the catalyst 2 may be left on the wire mesh. Since the size of recovering metal pieces may differ with the conditions of kind of recovering metal, heating temperature of the catalyst 2, oxygen concentration, and the like, the recovery condition, the size of the catalyst 2, the opening of the wire mesh, and the like are preliminarily adjusted so as the large metal pieces to be left on the wire mesh to recover the target metals.

FIG. 5 shows the means for treating waste plastics and organics 1 in horizontal position. The reactor 3 may be tilted so as the downstream end 36 to become higher than the upstream end 33. When the downstream end 36 is positioned higher than the position of upstream end 33, the catalyst 2 which was transferred by the circulation means 5 to the downstream end 36 can be slid-down through the returning passage 20 by its own weight, thus can be returned to the upstream end 33. In that case, the returning passage 20 may be a chute to connect the downstream end 36 in the reactor 3 with the upstream end 33 therein.

Example 4

As illustrated in FIG. 6, Petri dishes as the medical waste were put in the cage 40. The cage 40 containing the Petri dishes is put in the reactor 3 through the charge opening 41.

Then, the catalyst 2 was let flow down into the reactor 3 through the vent opening 39. Thus the catalyst 2 flows down from the upstream end 33 in the reactor 3 to the downstream end 36 therein. Next, the screw feeder is actuated. Thus the catalyst 2 accumulated near the downstream end 36 returns to the upstream end 33 in the reactor 3 via the returning passage 20. The flowing-down of the catalyst 2 is stopped when the volume or mass of the catalyst 2 accumulated in the circulation passage reaches a desired value.

The heating means 9 heats the system so as the temperature of the catalyst 2 in the reactor 3 to become in a range from 420° C. to 560° C. Since the catalyst is not deteriorated even retaining in the reactor, the succeeding decomposition operation can begin from the step of heating the catalyst 2 in the reactor 3.

During the course of flowing down (circulation) of the catalyst 2 at the catalyst-activation temperature from the upstream end 33 in the reactor 3 to the downstream end 36 therein, the Petri dishes contact with the catalyst 2, and are gasified. Gasification of Petri dish generates gas consisting mainly of carbon dioxide and water vapor.

Since the catalyst 2 which reaches the downstream end 36 in the reactor 3 returns to the upstream end 33 in the reactor 3 via the returning passage 20, the catalyst 2 circulates in the reactor 3. Consequently, the catalyst 2 at high activation state can be successively charged onto the Petri dishes.

The above gas (gasified organics) is sent to the lime neutralization treatment means, and then to the oxidation catalyst treatment means. The step of removing toxic gas in the exhaust gas is not described in the example.

Example 5

Decomposition System for Waste Plastics and Organics According to the Present Invention Using the decomposition apparatus described in Example 1, the titanium oxide granules in the reactor 3 are further heated to a temperature range from 420° C. to 560° C. The characteristics of the titanium oxide as the active ingredient in the applied titanium oxide granules are (1) specific surface area in a range from 35 to 50 $m^2/g$, and (2) size of granules of 3.5 mesh (5.60 mm) or smaller.

The applied waste plastics and organics are the plastics which generate chlorine, hydrogen chloride, sulfur compounds, nitrogen compounds, and the like in the decomposition step.

Compared with the conventional decomposition method, the above-described decomposition system shows significantly high decomposition efficiency. Furthermore, with the lime neutralization treatment step using the lime neutralization means and with the oxidation catalyst treatment step using the oxidation catalyst treatment means, the above decomposition method conducts easily the treatment of plastics and organics generating HCl, hydrogen fluoride, sulfur compounds, nitrogen compounds, and the like in the decomposition step, of biological substances such as blood, and of fluorine compounds generating hydrogen fluoride. In addition, the above decomposition method easily conducts separation and recovery of metals and inorganics which are mixed in the waste plastics and organics or which are vapor-deposited or adhered to at least one side of the surface thereof.

All the examples of the present invention described above can be carried out in modes after applying varieties of improvements, modifications, and changes on the basis of the knowledge of the persons skilled in the art within a range not to depart from the scope of the present invention.

INDUSTRIAL APPLICABILITY

The present invention is a useful technology for treating all kinds of waste including plastics, not limited to medical waste.

BRIEF DESCRIPTION OF THE DRAWINGS

FIGS. 2(1) to 2(5) show schematic drawings illustrating various modes of the means for treating organics according to the first embodiment of the present invention.

FIGS. 7(a) and 7(b) show perspective views of modification examples of the transfer means and the agitation means, respectively, applied to the means for treating organics according to the embodiments of the present invention.

DESCRIPTION OF THE REFERENCE SYMBOLS

Figure 1:
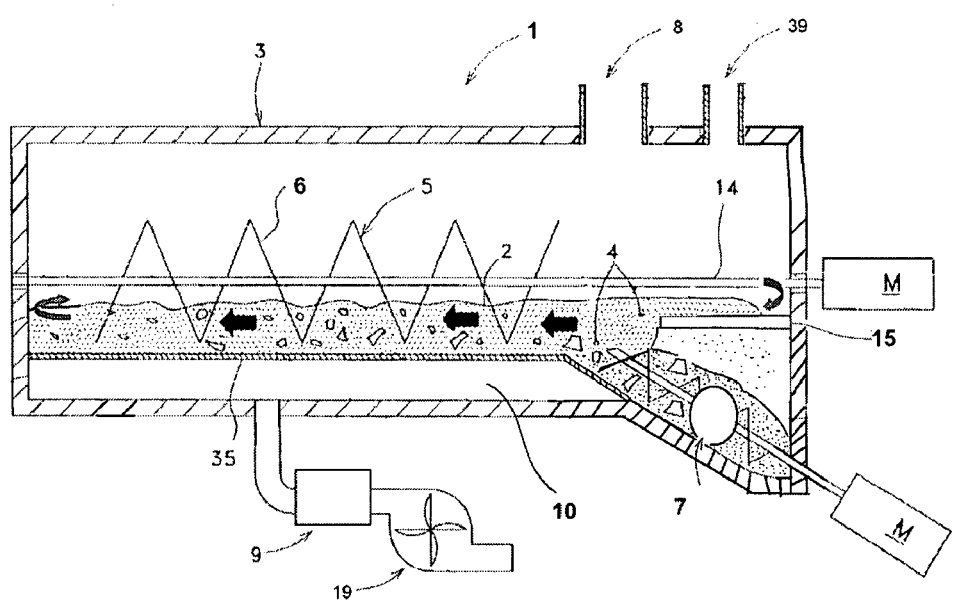
FIG. 1 shows a schematic drawing illustrating the main parts of the means for treating organics according to a first embodiment of the present invention.
Figure 3:
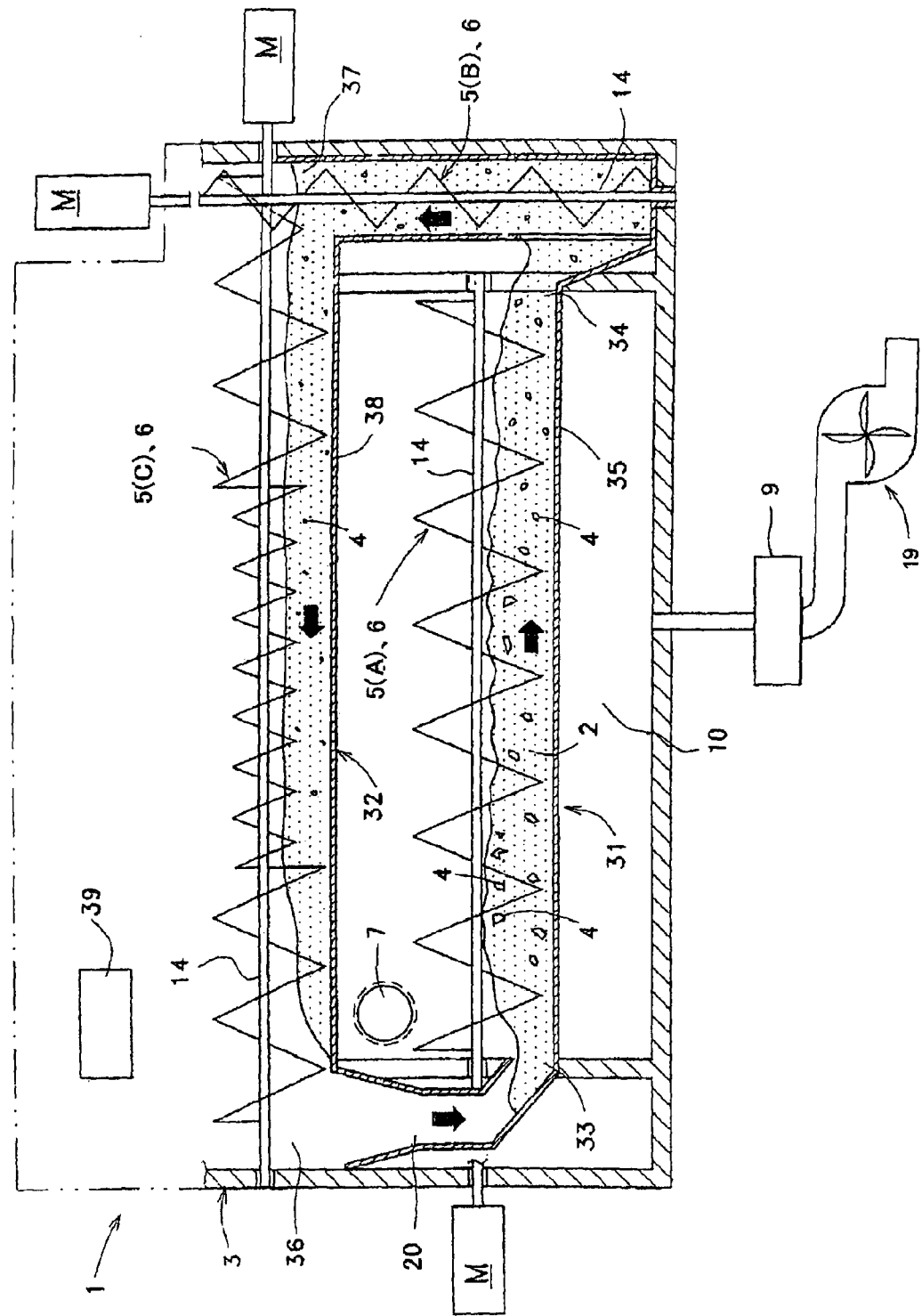
FIG. 3 shows a schematic drawing illustrating the main parts of the means for treating organics according to a second embodiment of the present invention.
Figure 4:
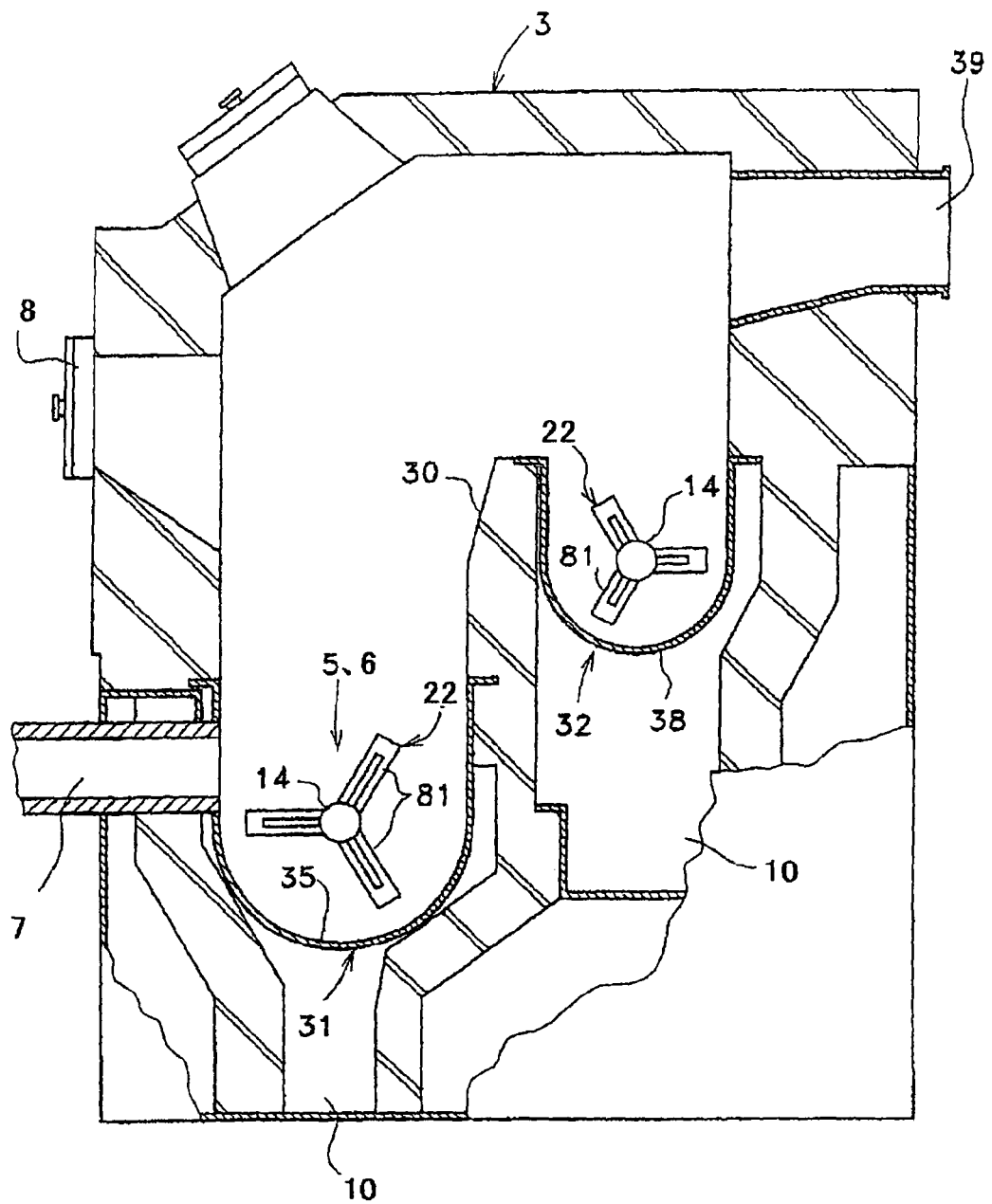
FIG. 4 shows a cross sectional view of the means for treating organics according to the second embodiment of the present invention.
Figure 5:
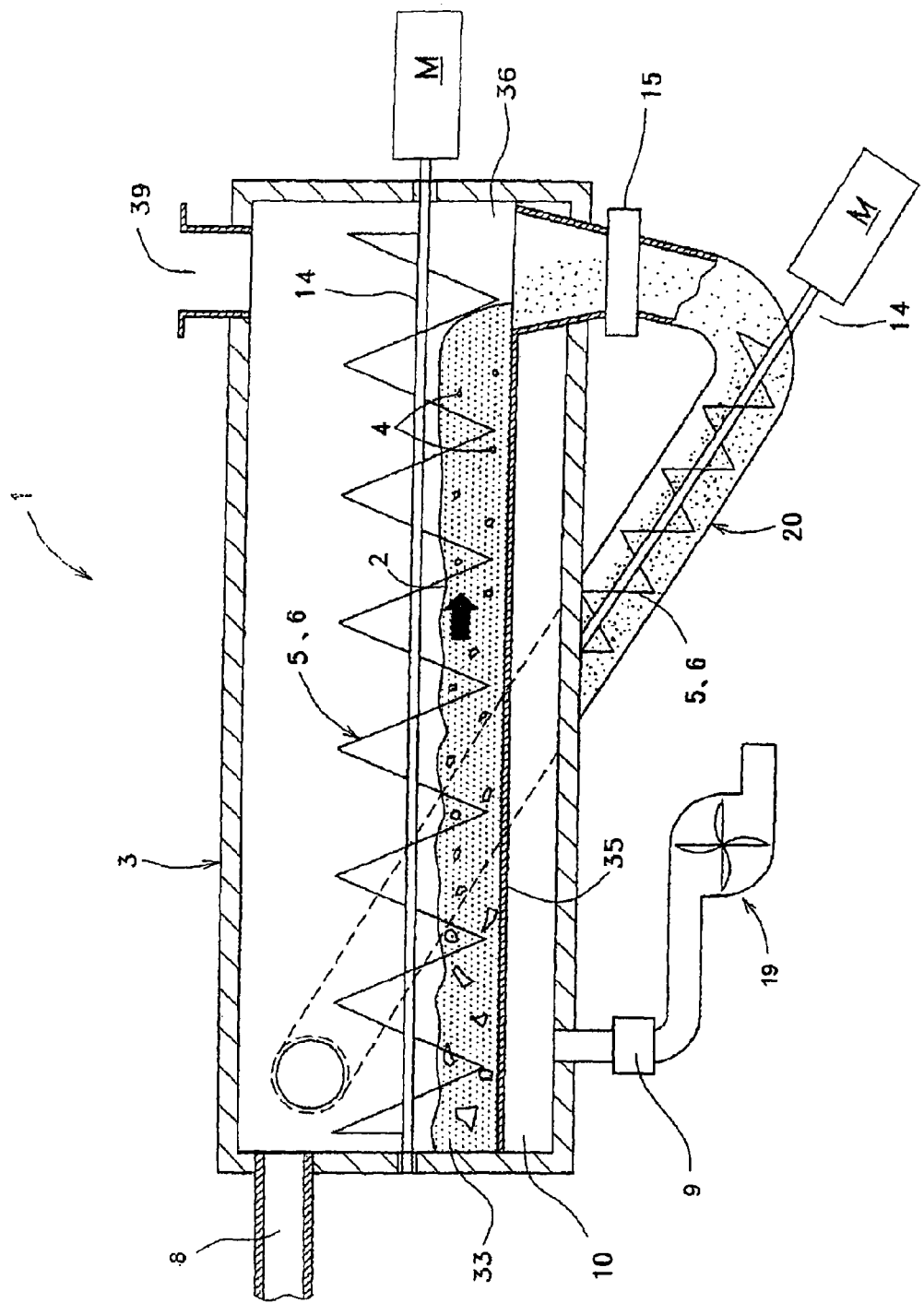
FIG. 5 shows a schematic drawing illustrating the main parts of the means for treating organics according to a third embodiment of the present invention.
Figure 6:
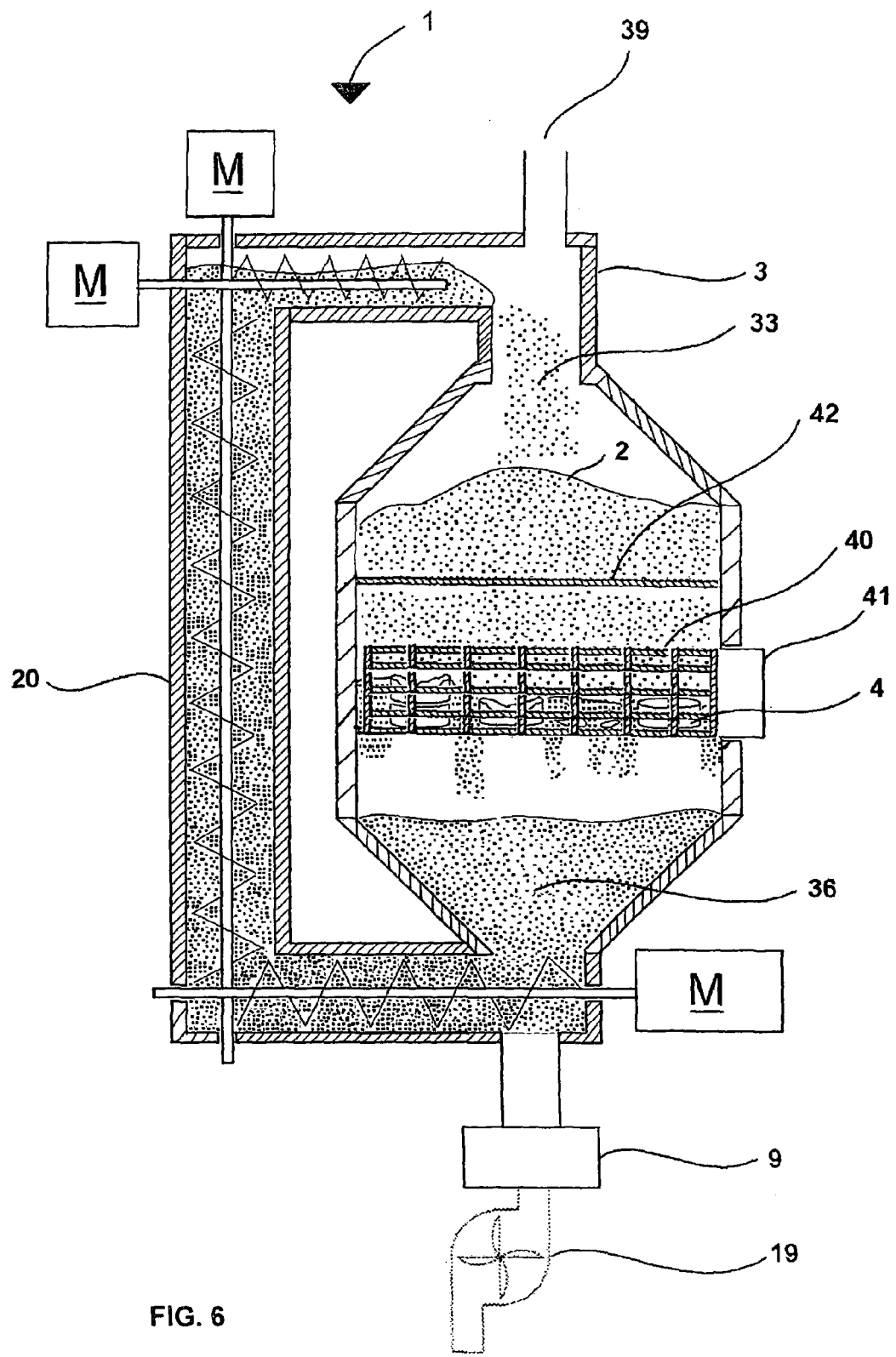
FIG. 6 shows a schematic drawing illustrating the main parts of the means for treating organics according to a fourth embodiment of the present invention.
Figure 8:
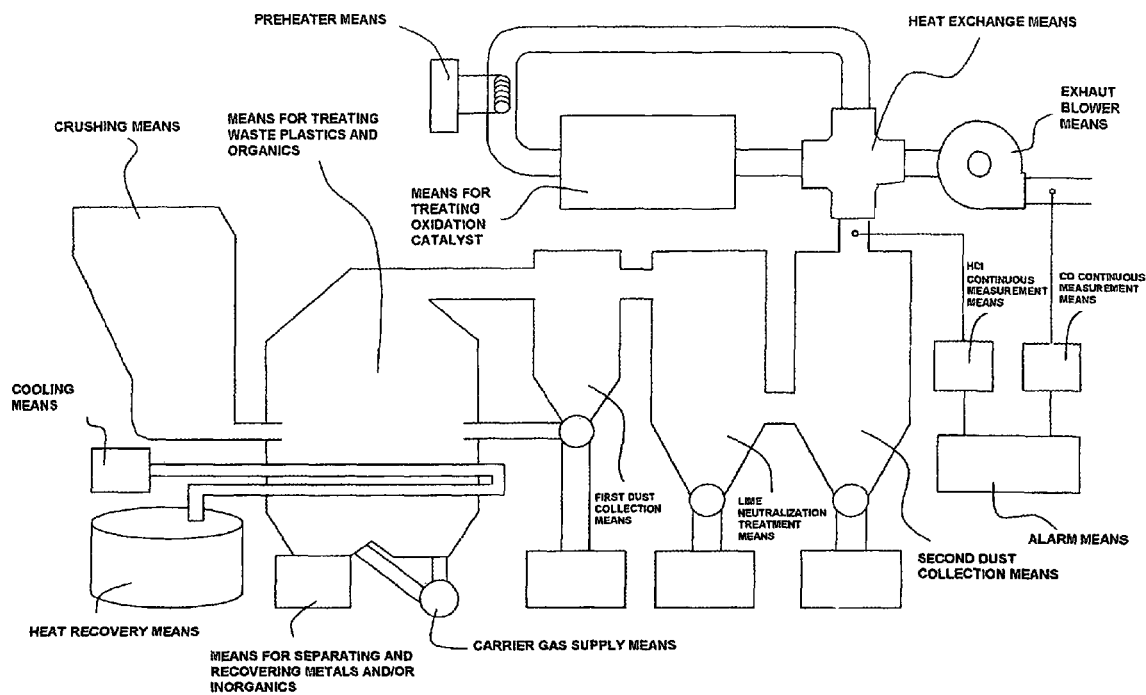
FIG. 8 shows a block flow diagram of the decomposition apparatus for waste plastic and organics according to the examples of the present invention.
Figure 9:
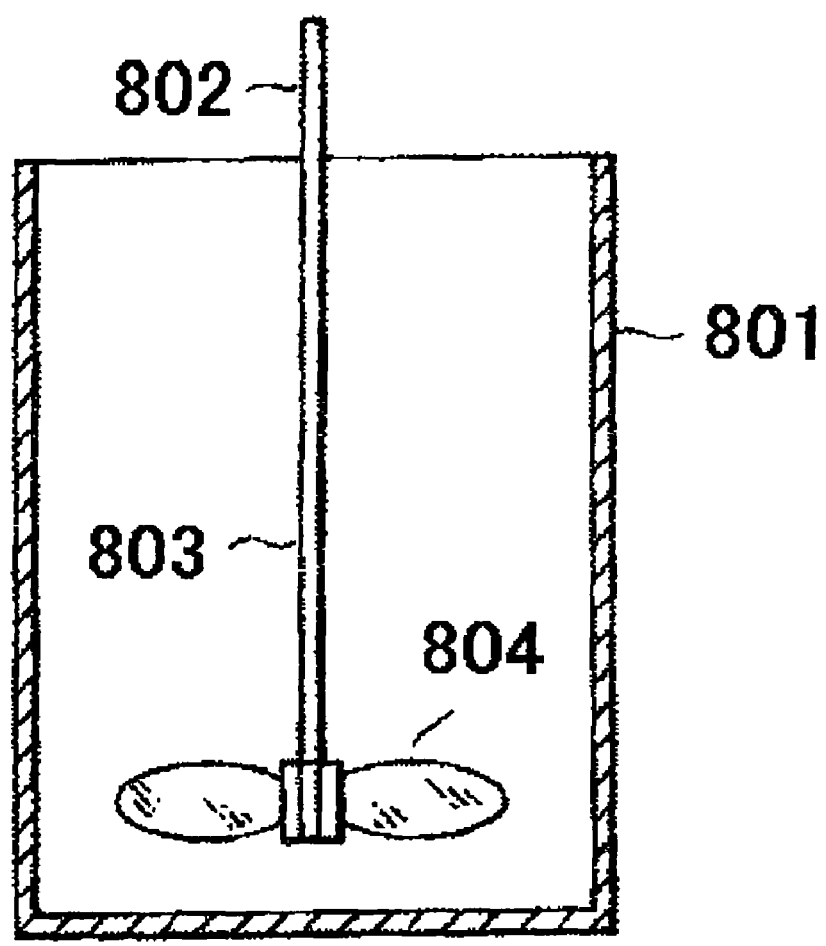
FIG. 9 illustrates an apparatus for determining the abrasion rate of titanium oxide.
Figure 10:
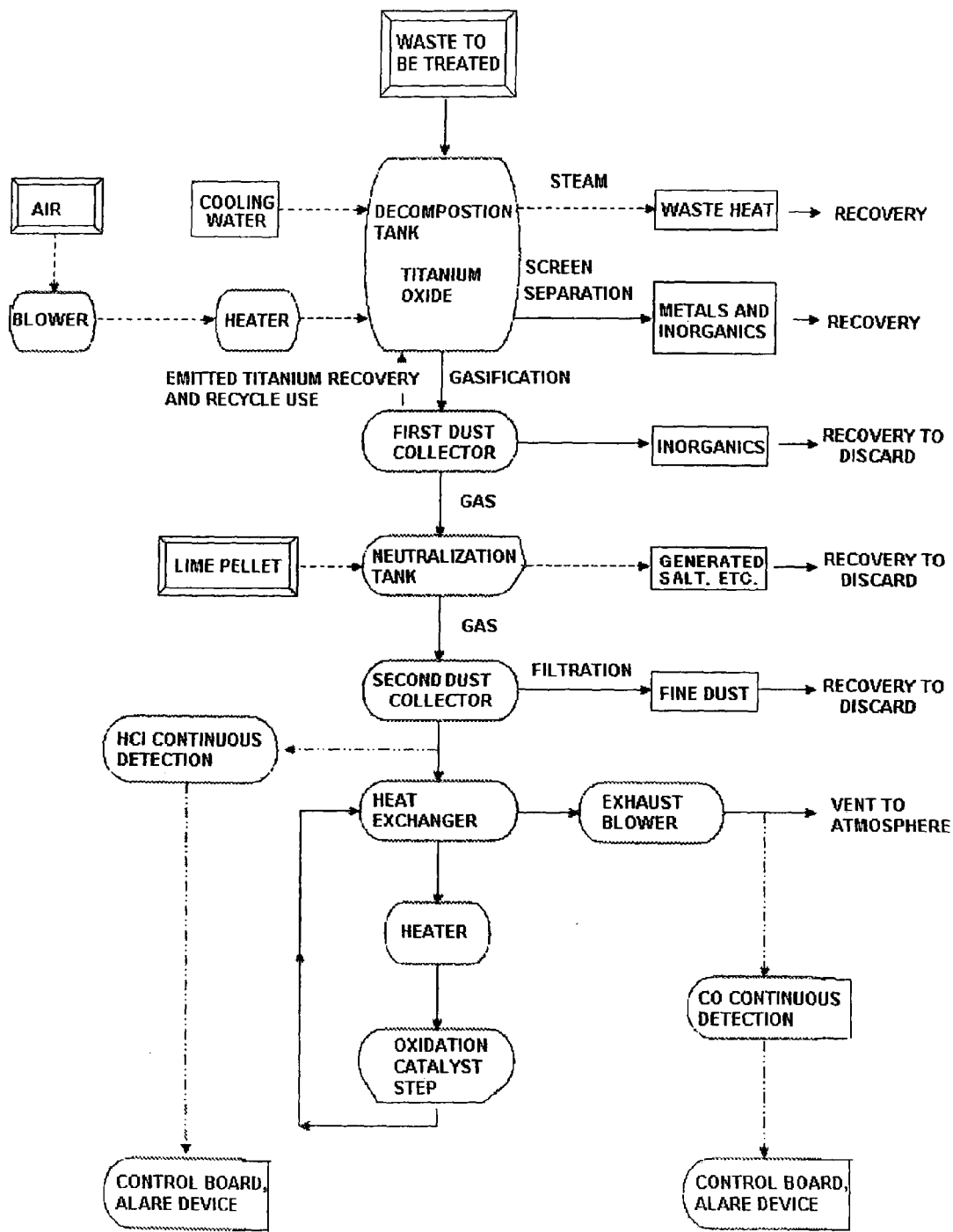
FIG. 10 illustrates a flow of a decomposition system according to the present invention.
Figure 11:
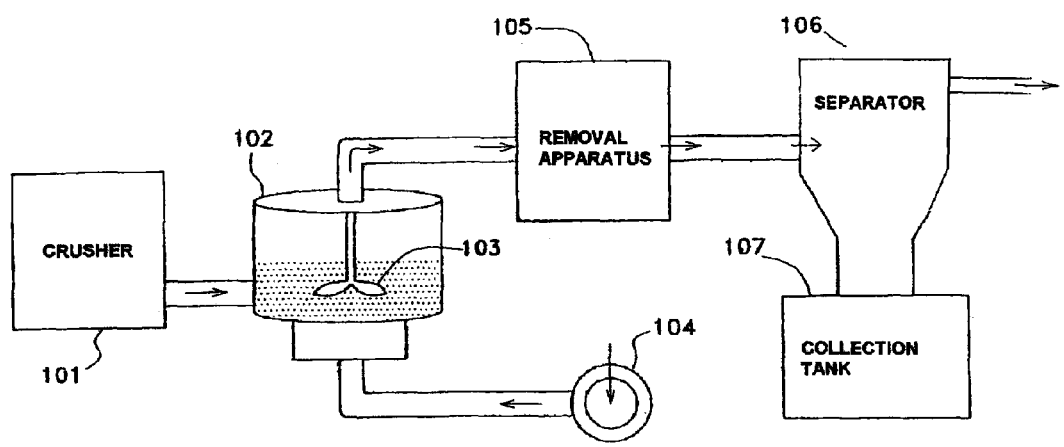
FIG. 11 shows a block diagram of conventional apparatus for decomposing organics.

1: means for treating waste plastics and organics
2: catalyst
3: reactor
4: waste plastics and organics
5: circulation means
6: agitation means
7: charge opening
8: charge opening
9: heating means
10: air-blowing chamber
11: partition wall
12: paddle
13: concave portion
14: rotary shaft
15: means for separating and recovering metals and/or inorganics
16: wire mesh having an opening to allow the catalyst 2 of largest size to pass through
17: pocket for collecting metals and/or inorganics
18: discharge opening for metals and inorganics
19: air-supply blower
20: returning passage
21: spiral blade
22: blade row
23: crushing means
24: charge opening of solid waste plastics and organics
25: degradation site of waste plastics and organics
30: partition wall
31: first stage tank
32: second stage tank
33: upstream end
34: discharge end
35: permeable bottom
36: downstream end
37: charge end
38: permeable bottom
39: vent opening
40: cage
41: charge opening
42: mesh
81: three-piece blades
82: notch
83: axial flow blade
84: projected piece
85: projected piece
801: sample vessel
802: agitator
803: shaft body
804: agitation blade

What is claimed is:

1. An apparatus for decomposing waste plastics and organics, comprising (1) a means for treating waste plastics and organics, and (2) a means for treating oxidation catalyst, wherein the means for treating waste plastics and organics includes:
   a reactor which circulates a catalyst from upstream end to downstream end in the reactor;
   a circulation means which circulates waste plastics and/or organics charged from a charge opening of the reactor together with the catalyst from the upstream end to the downstream end;
   an agitation means which agitates the catalyst and the waste plastics and/or organics in the reactor; and
   a returning passage which guides the catalyst from the downstream end to the upstream end of the reactor in the reactor,
   the waste plastics and/or organics being gasified in the step of circulating the waste plastics and/or organics together with the catalyst from the upstream end to the downstream end of the reactor, and wherein the step of circulation in the reactor has a means for separating and recovering metals and/or inorganics.

2. The apparatus for decomposing waste plastics and organics according to claim 1, wherein the circulation and/or agitation means is one or more screw feeders which have spiral blades mounted to the respective rotary shafts rotated by the respective drive sources, the rotary shafts being inserted into the reactor.

3. The apparatus for decomposing waste plastics and organics according to claim 2, wherein the two screw feeders are located in substantially horizontal position in the reactor, and the rotation of the two screw feeders circulates the waste plastics and/or organics together with the catalyst in the reactor substantially in horizontal direction.

4. The apparatus for decomposing waste plastics and organics according to claim 1, wherein the reactor is divided into a first stage tank having the upstream end, and a second stage tank having the downstream end and being located at higher position than the position of first stage tank, thereby the catalyst being guided from the downstream end in the second stage tank into the returning passage to flow down to the upstream end in the first stage tank.

5. The apparatus for decomposing waste plastics and organics according to claim 1, wherein the upstream end and the downstream end in the reactor are located substantially in horizontal position, thereby the catalyst after sliding down from the downstream end by the self weight being guided into the returning passage, and then flowing up to the upstream end.

6. The apparatus for decomposing waste plastics and organics according to claim 1, wherein the circulation means is a screw feeder which has a spiral blade mounted to a rotary shaft rotated by a drive source, the rotary shaft being inserted into the reactor.

7. The apparatus for decomposing waste plastics and organics according to claim 6, wherein the spiral blade has an auxiliary blade.

8. The apparatus for decomposing waste plastics and organics according to claim 1, wherein the means for treating waste plastics and organics includes:
   a reactor which circulates a catalyst from upstream end to downstream end in the reactor;
   a cage which can position the waste plastics and/or organics in the reactor; and
   a returning passage which guides the catalyst from the downstream end to the upstream end of the reactor in the reactor, the waste plastics and/or organics in the cage being contacting with the catalyst and further being gasified in the step of dropping (circulating) the catalyst from the upstream end to the downstream end of the reactor.

9. The apparatus for decomposing waste plastics and organics according to claim 1, wherein the reactor can supply a carrier gas from a plurality of holes opened on the bottom of the reactor directly into the catalyst in a uniformly distributed manner.

10. The apparatus for decomposing waste plastics and organics according to claim 1, wherein the means for separating and recovering metals and/or inorganics is a means for separating the catalyst from a mixture of the waste plastics and/or organics and the catalyst in the step of circulation in the reactor.

11. The apparatus for decomposing waste plastics and organics according to claim 10, wherein the means for separating the catalyst from a mixture of the waste plastics and/or organics and the catalyst is a means for separating the metals and/or inorganics from the catalyst based on the size difference therebetween.

12. The apparatus for decomposing waste plastics and organics according to claim 11, wherein the means for separating the metals and/or inorganics from the catalyst based on the size difference therebetween installs a sieve which allows the catalyst to pass therethrough in the step of circulation in the reactor.

13. The apparatus for decomposing waste plastics and organics according to claim 1, further comprising one or more of the following means:
   (1) alumina catalyst treatment means
   (2) crushing means
   (3) carrier gas supply means
   (4) cyclone dust collection means
   (5) dust collection means with bag filter
   (6) heat exchange means
   (7) preheater means
   (8) exhaust blower means
   (9) cooling means
   (10) heat recovery means
   (11) HCl continuous measurement means
   (12) CO continuous measurement means
   (13) alarm means
   (14) lime neutralization treatment means.

14. A decomposition system for decomposing waste plastics and organics using a decomposition apparatus according to claim 1, thereby decomposing the waste plastics and organics while controlling the heating temperature of the catalyst, composed of titanium oxide granules in which the active ingredient is titanium oxide, within the range of 420° C. to 560° C.

15. The decomposition system according to claim 14, wherein the titanium oxide granules in which the active ingredient is titanium oxide have characteristics of:
   (1) the specific surface area from 35 to 50 $m^2/g$; and
   (2) the granule size of 3.5 mesh (5.60 mm) or smaller.

16. The decomposition system according to claim 15, wherein the titanium oxide granules are a mixture of titanium oxide as the active ingredient and any one of below (1) and (2):
   (1) aluminum oxide, and
   (2) silicon oxide.

* * * * *